US012002322B2

(12) United States Patent
Hawkins et al.

(10) Patent No.: US 12,002,322 B2
(45) Date of Patent: Jun. 4, 2024

(54) ELECTRONIC GAMING DEVICE HAVING LOOKUP TABLES ASSOCIATED WITH TARGETED VOLATILITY AND WIN LIABILITY CONTROLS

(71) Applicant: Aristocrat Technologies, Inc. (ATI), Las Vegas, NV (US)

(72) Inventors: Ryan Hawkins, Henderson, NV (US); Stephanie Klepzig, Las Vegas, NV (US); Robert Honeycutt, Henderson, NV (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 133 days.

(21) Appl. No.: 17/704,949

(22) Filed: Mar. 25, 2022

(65) Prior Publication Data

US 2023/0306809 A1 Sep. 28, 2023

(51) Int. Cl.
*G07F 17/32* (2006.01)

(52) U.S. Cl.
CPC ...... *G07F 17/3213* (2013.01); *G07F 17/3244* (2013.01); *G07F 17/3267* (2013.01)

(58) Field of Classification Search
CPC ............. G07F 17/3213; G07F 17/3244; G07F 17/3267
See application file for complete search history.

(56) References Cited

U.S. PATENT DOCUMENTS 10,089,819 B1 * 10/2018 Halvorson .......... G07F 17/3209
10,468,745 B2 11/2019 Jeon
10,546,466 B2 1/2020 Lee
10,872,502 B2 12/2020 Kendall
11,468,745 B2 10/2022 Lee
2008/0113735 A1 5/2008 Maya
2009/0124364 A1 5/2009 Cuddy
2010/0029364 A1 2/2010 Zielinski
2012/0034968 A1 2/2012 Watkins
2012/0077564 A1 3/2012 Collette
2014/0295935 A1 * 10/2014 Pawloski ................ G07F 17/34 463/20
2014/0295936 A1 * 10/2014 Pawloski ............ G07F 17/3265 463/20
2014/0309010 A1 * 10/2014 Pawloski ................ G07F 17/34 463/20
2014/0309011 A1 * 10/2014 Pawloski ................ G07F 17/34 463/20

(Continued)

OTHER PUBLICATIONS

Notice of Allowance dated Mar. 18, 2020, for U.S. Appl. No. 16/143,101 (pp. 1-5).

(Continued)

*Primary Examiner* — Chase E Leichliter
(74) *Attorney, Agent, or Firm* — McAndrews, Held & Malloy, Ltd.

(57) ABSTRACT

An electronic gaming device including a display device operable to display a portion of a plurality of reels, and a controller. The controller includes a processor to associate a first lookup table and a second lookup table with a first symbol and a second symbol from a first reel, respectively, select a first entry in the first table that satisfies a target threshold, convert the first symbol with the first entry, and evaluate the portion of the plurality of reels for a win combination that satisfies the target threshold.

20 Claims, 14 Drawing Sheets

(56) References Cited

U.S. PATENT DOCUMENTS

| | | | | |
|---|---|---|---|---|
| 2015/0105138 | A1* | 4/2015 | Delekta | G07F 17/3227 463/20 |
| 2015/0332560 | A1* | 11/2015 | Fulton | G07F 17/3213 463/20 |
| 2015/0348357 | A1 | 12/2015 | Bartosik | |
| 2016/0140793 | A1 | 5/2016 | Marks | |
| 2017/0046911 | A1 | 2/2017 | Batsiokis | |
| 2017/0084112 | A1 | 3/2017 | Batsiokis | |
| 2017/0092067 | A1 | 3/2017 | Batsiokis | |
| 2019/0355206 | A1 | 11/2019 | Kania | |
| 2020/0184766 | A1* | 6/2020 | Halvorson | G07F 17/3209 |
| 2020/0364972 | A1 | 11/2020 | Hawkins | |
| 2022/0309871 | A1 | 9/2022 | Hawkins | |
| 2023/0306809 | A1* | 9/2023 | Hawkins | G07F 17/3213 463/20 |

OTHER PUBLICATIONS

Office Action (Notice of Allowance and Fees Due (PTOL-85)) dated Aug. 17, 2021 for U.S. Appl. No. 16/933,963 (pp. 1-9).

Australian Examination Report No. 1 issued in App. No. AU2018236797, dated Oct. 18, 2022, 2 pages.

Office Action (Non-Final Rejection) dated Apr. 6, 2023 for U.S. Appl. No. 17/543,220 (pp. 1-6).

Office Action (Notice of Allowance and Fees Due (PTOL-85)) dated Jul. 20, 2023 for U.S. Appl. No. 17/543,220 (pp. 1-5).

* cited by examiner

ELECTRONIC GAMING DEVICE HAVING LOOKUP TABLES ASSOCIATED WITH TARGETED VOLATILITY AND WIN LIABILITY CONTROLS

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Gaming systems or devices may allow players to win awards. The awards may be determined based on predefined volatility criteria. Yet a technical problem exists involving how a gaming device may satisfy a designated game payout that either complies with regulation for a game feature or is set to achieve a certain game volatility, where the gaming device generates a connected pay combination employing a single or a stack of credit value symbols and/or jackpot symbols.

In certain scenarios, a game outcome may exceed or be less than a target volatility criterion or threshold. For example, by randomly landing a single or stacks of credit symbols and/or jackpot symbols, the game device may randomly produce payouts that are too large for the target volatility criterion or designated RTP for a jurisdiction. Alternatively, if the outcome fails to land sufficient single or stacks of credit symbols, the payout may be relatively small, or below the target payout volatility or designated RTP.

As result, to meet or satisfy a target volatility criteria or designated RTP, the random nature of a game determination would, in turn, require repeated random re-spins and evaluation of game outcomes in the background until the game randomly generates an outcome that satisfies the target volatility criterion or designated RTP. Thus, a game device may need process and generate numerous game outcomes in the background before determining and displaying a game outcome to a player that satisfies the target volatility criterion or designated RTP for the designated jurisdiction. The repeated determination of whether each of the numerous game outcomes may be an inefficient, and time and resource consuming process.

Further limitations and disadvantages of conventional and traditional approaches will become apparent to one of skill in the art, through comparison of such systems and devices with some aspects of the present disclosure as set forth in the remainder of the present application with reference to the drawings.

SUMMARY

In an implementation, a gaming system or gaming device employs a reel-specific lookup tables technique that dynamically associates the lookup table with symbol type to a reel for determining winning symbol combinations. This technique reduces and/or avoids generating multiple game outcomes before finding a game outcome that satisfies one or more target thresholds that may include a designated or target RTP, a target game outcome, a target game payout, a target game volatility, a target win liability, a target maximum win liability, substantially as shown in and/or described in connection with at least one of the figures, as set forth more completely in the claims.

By way of example, an implementation comprises an electronic gaming device for controlling outcome volatility. The electronic gaming device includes a display device and a game controller. The display device is operable to display at least a portion of a plurality of reels. Each reel has a plurality of symbol positions. The game controller comprises a processor and memory storing a symbol set including a plurality of game symbols, a plurality of lookup tables, each of the plurality of lookup tables including a plurality of entries, the plurality of reels associated with one or more target thresholds, respectively, and instructions. The instructions, which, when executed, cause the processor to at least associate a first table and a second table of the plurality of lookup tables with a first game symbol and a second game symbol from a first reel of the plurality of reels. The processor selects a first entry from the plurality of entries in the first table satisfying a first target threshold of the target thresholds based on one or more random numbers generated by a random number generator, changes the first game symbol into a first converted symbol with the first entry selected on the first reel of the plurality of reels, evaluates whether the first converted symbol is selected for display on the first reel, and determines a payout from the first converted symbol on the first reel.

By way of yet another example, an implementation comprises a method for controlling a gaming system that comprises a plurality of devices, and a server being coupled to the plurality of devices. The server includes a processor and a memory storing a plurality of game symbols on a set of reel strips, one or more target thresholds, a plurality of lookup tables, each of the plurality of lookup tables including a plurality of entries, and instructions. The method comprises associating a first table and a second table of the plurality of lookup tables with a first game symbol and a second game symbol on a first reel strip of the set of reel strips, overlaying the first game symbol and the second game symbol with the plurality of entries in the first table and the second table satisfying a first target threshold of the target thresholds, respectively, selecting randomly a subset of the plurality of game symbols for each reel strip of the set of reel strips based on one or more random numbers generated by a random number generator, and determining if a win combination exists across the set of reel strips based on the subset of the plurality of game symbols selected.

Another implementation comprises a non-transitory computer-readable medium that includes a plurality of target thresholds, a plurality of game symbols, a plurality of lookup tables, each of the plurality of lookup tables including a plurality of entries, a plurality of reels, and instructions for conducting a game on a plurality of devices comprising a display device operable to display a portion of the plurality of reels, and a controller comprising a processor. The instructions, when executed, cause the processor to perform the steps of associating a first table and a second table of the plurality of lookup tables with a first game symbol and a second game symbol on a first reel strip of the set of reel strips, overlaying the first game symbol and the second game symbol with the plurality of entries in the first table and the second table satisfying a first target threshold of the target thresholds, respectively, selecting randomly a subset of the plurality of game symbols for each reel strip of the set of reel strips based on one or more random numbers generated by a random number generator, and determining if a win combination exists across the set of reel strips based on the subset of the plurality of game symbols selected.

These and other variations, advantages, aspects and novel features of the present disclosure, as well as details of illustrated implementations thereof, will be more fully understood from the following description and drawings.

DETAILED DESCRIPTION

Figure 1:
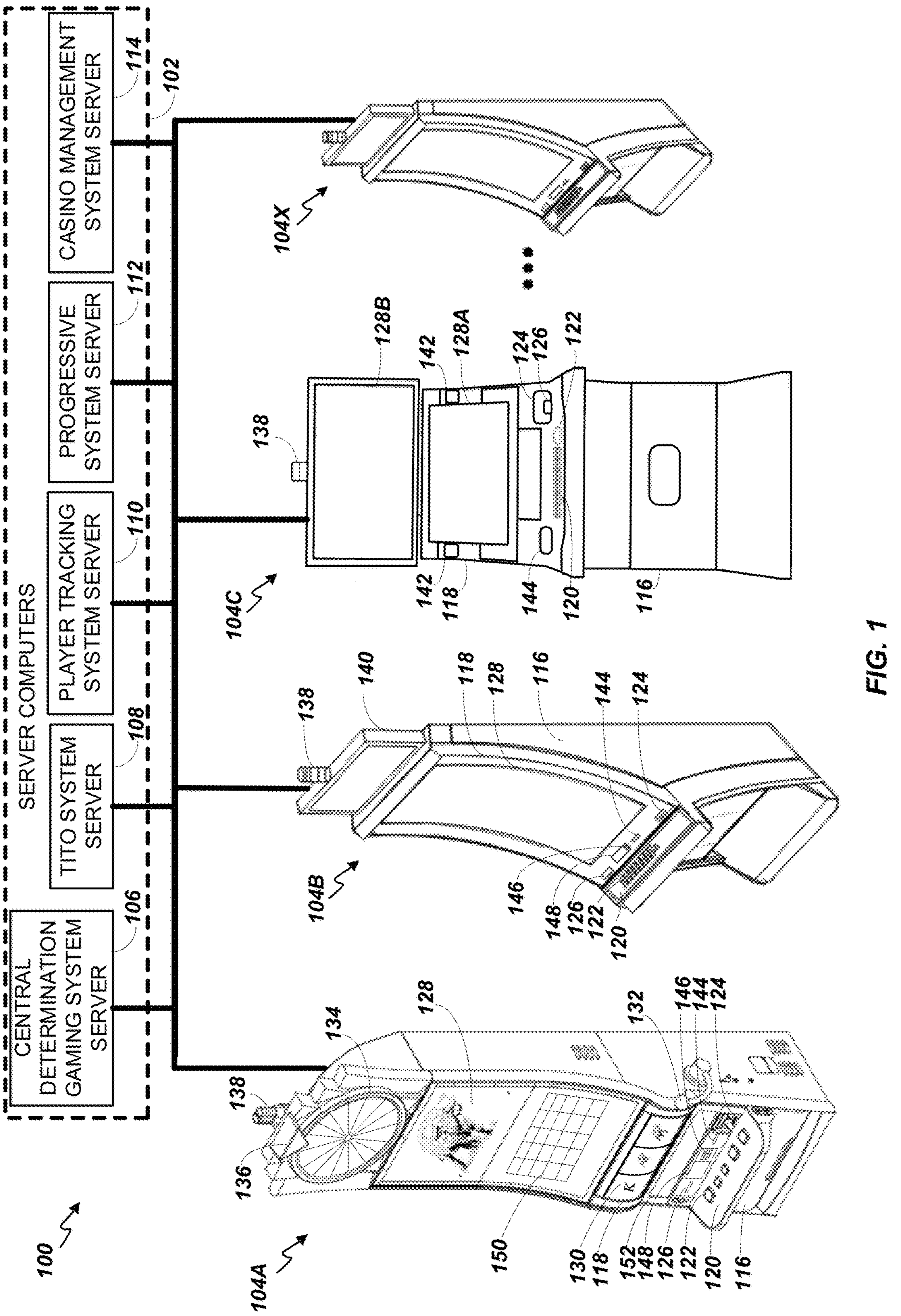
FIG. 1 is an exemplary diagram showing several EGMs networked with various gaming related servers.

Implementations of the present disclosure represent a technical improvement in the art of gaming technology. Specifically, the implementations illustrated address the technical problem of controlling volatility to meet one or more target thresholds that may include a designated or target RTP, a target game outcome, a target game payout, a target game volatility, a target win liability, a target maximum win liability, and the like, in an electronic gaming device in a feature mode that evaluates fewer than all of the visible reels for an outcome. In this regard, a gaming establishment may consider controlling volatility to meet a targeted RTP such that a maximum win liability, which refers to a maximum payout based on a game outcome, stays within a predetermined amount. For example, in jurisdictions, such as Australia and Illinois, a game cannot exceed the maximum liability, and thus, requiring game designers to implement mechanism to ensure the maximum payout does not exceed a certain predetermined amount. For example, unlike other gaming implementations that require generating multiple game outcomes thus possibly causing relatively higher latency and/or intensive data processing, these implementations reduce and/or avoid randomly generating multiple game outcomes before finding an outcome that satisfies one or more target thresholds such as a target volatility criterion. More specifically, these implementations may allow a game to generate a single game outcome by controlling the volatility to meet one or more target thresholds such as a target volatility criterion or target RTP via reel-specific and symbol specific lookup tables associated with a reel and a symbol type, thus possibly reducing latency and/or lowers the intensity of data processing thus draining less device resources for the game. Further, instead of randomly generating game outcomes until the game satisfies one or more target thresholds such as the target volatility criterion or threshold in one or more game instances driven by fewer than all of the visible reels for an outcome, the implementations illustrated associate one or more reel strips to multiple lookup tables used to generate the credit values for credit value symbols. By doing so, the technique can control game volatility and/or maximum win liability for one or more game instances.

In some implementations, as a general overview, in a 3×5 reel array, reels 3, 4, and 5 include multiple symbol types, where, for each reel, each symbol type would reference a different lookup table with different credit value ranges. Specifically, a feature mode, once triggered by non-feature reels, randomly selects credit value symbols or other symbol types for each special symbol (e.g., a Buffalo symbol) on the feature reels, i.e., reels 3, 4 and 5 in this case. In other words, credit value symbols or other symbol types are displayed or overlaid on every occurrence of a special symbol on the remaining reels (i.e., reels 3, 4 and 5). Each symbol type is associated to a different lookup table for the given symbol type and at least one reel. Multiple lookup tables may be linked to the special symbol types, whether stacked or single special symbols, on at least one reel strip by including multiple symbol types on a reel strip. The lookup tables may produce different ranges of special or credit values and/or symbols. The credit value or other symbol types on a given reel are then populated, e.g., sequentially, with credit values drawn from a lookup table corresponding to that reel and symbol type. This implementation provides symbol-driven efficiency simplicity in the outcome determination of such a feature mode, while still maintaining volatility control, user experience and feature mode usability.

Further, the visual overlay of one or more credit values by visually transforming special symbols overlaid with the credit values provides an improved electronic game machine display such that the player may only need to direct attention to symbols being displayed and differently overlaid, and the visual animations used to transform the displayed overlaid symbols obtain a better outcome and engage the player, without being overly burdened by complicated calculations or repeated reference to game rules.

Also, the graphical user interface employing the illustrated implementations can be improve the usability of electronic gaming devices by extending player time on the electronic gaming devices, and maintaining the interest of current players in the electronic gaming devices, which thereby enhances the user experience for players. Thus, implementations of the present disclosure are not merely new game rules or simply new display patterns, but provide technologic improvements to gaming technology in the art of electronic gaming devices and software for such electronic gaming devices.

Moreover, the above example is not intended to be limiting, but merely exemplary of technologic improvements provided by some implementations of the present disclosure. Technological improvements of other implementations are readily apparent to those of ordinary skill in the art in light of the present disclosure.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Other servers (not shown) may be employed to execute other game operations, e.g., a bingo server. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel (any of which may be flat, curved, combinations of both flat and curved), a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
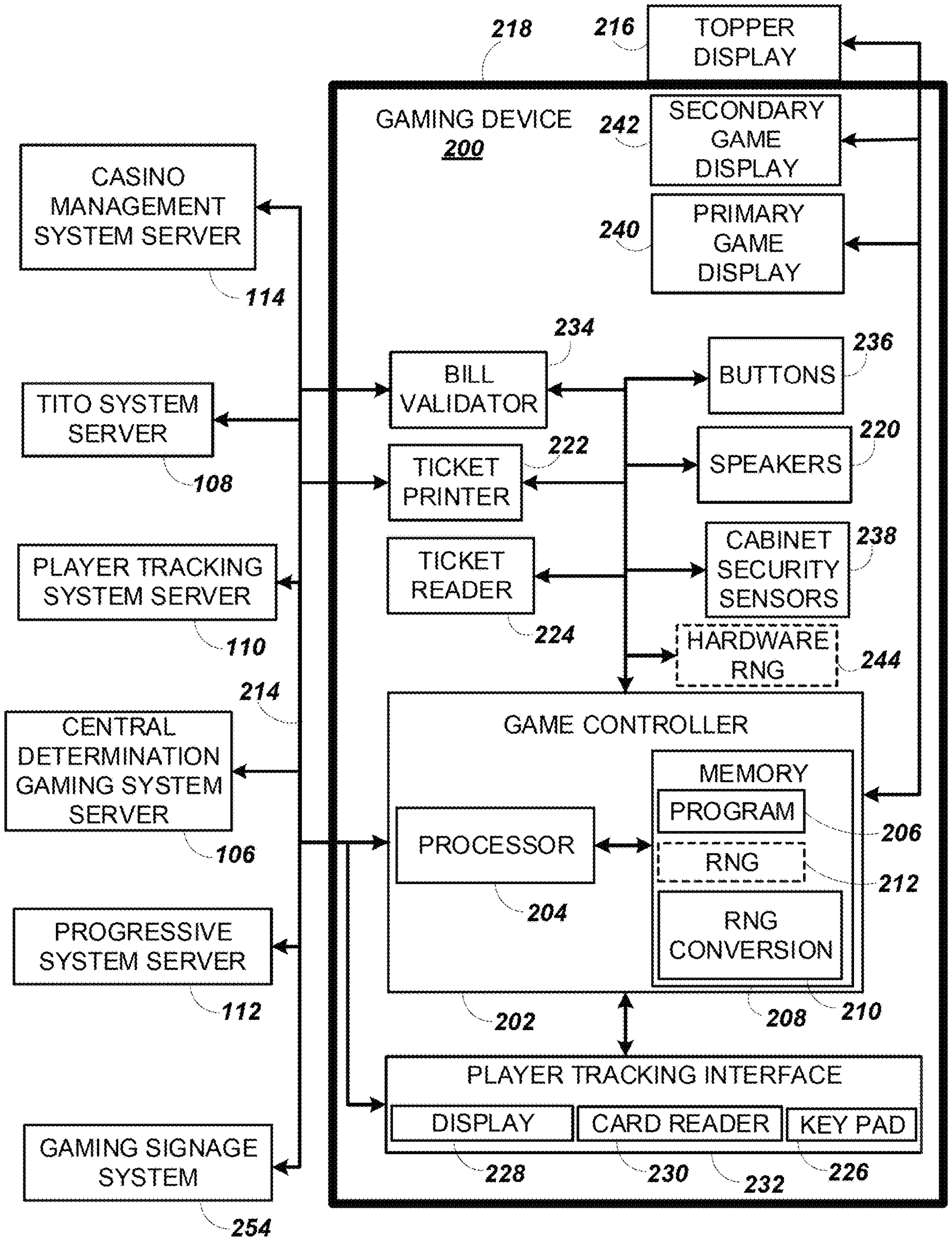
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in at least FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. Other bill validator 124 or other credit input mechanisms may also be employed, for example, a card reader for reading a smart card, debit card or credit card, or arrangements to interact with a digital wallet or the like. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects may be channeled to the player with a technically improved user interface, which simultaneously controllably synchronizes presenting different awardable symbol types and credit values to the player with visual and auditory effects to engage the player. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
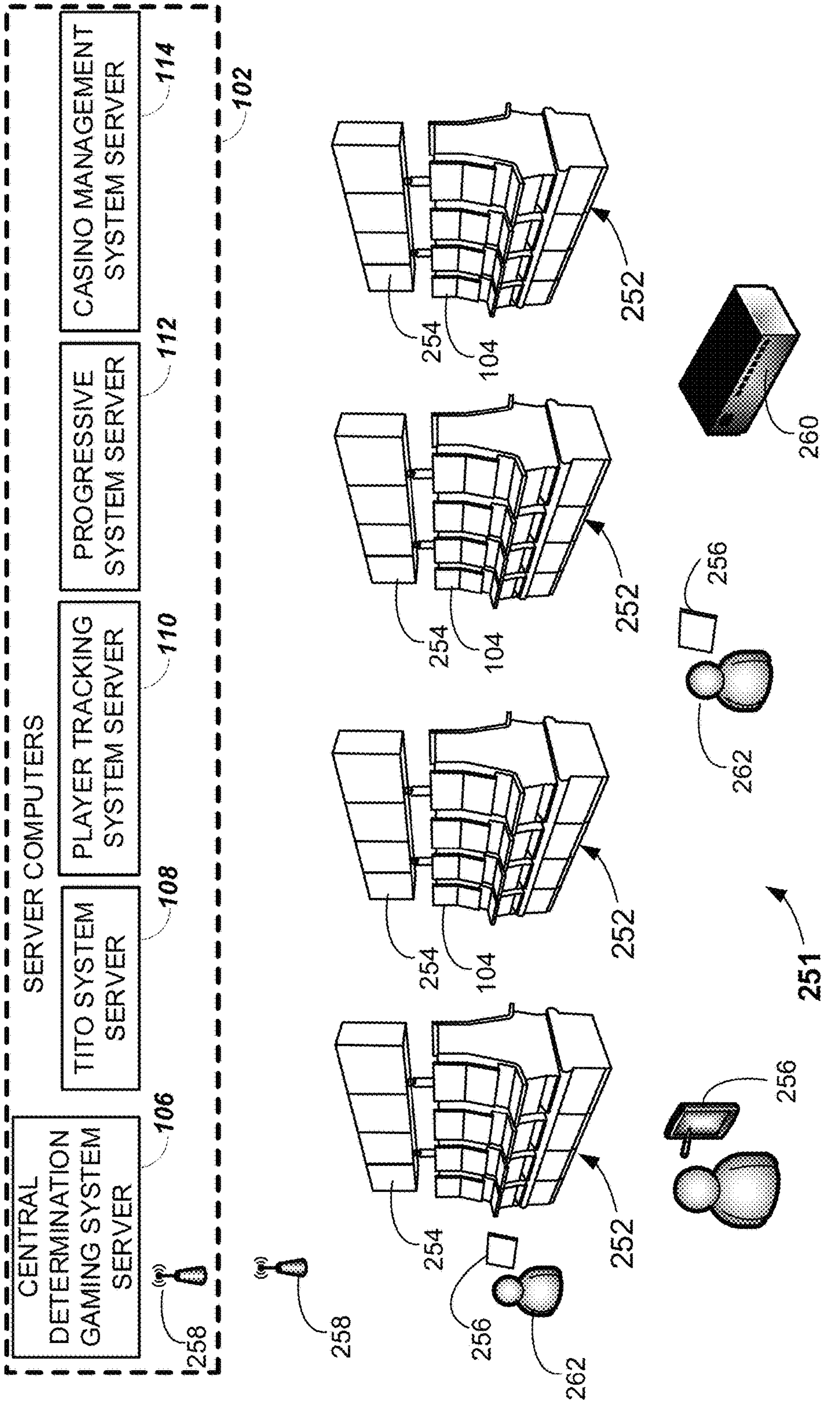
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
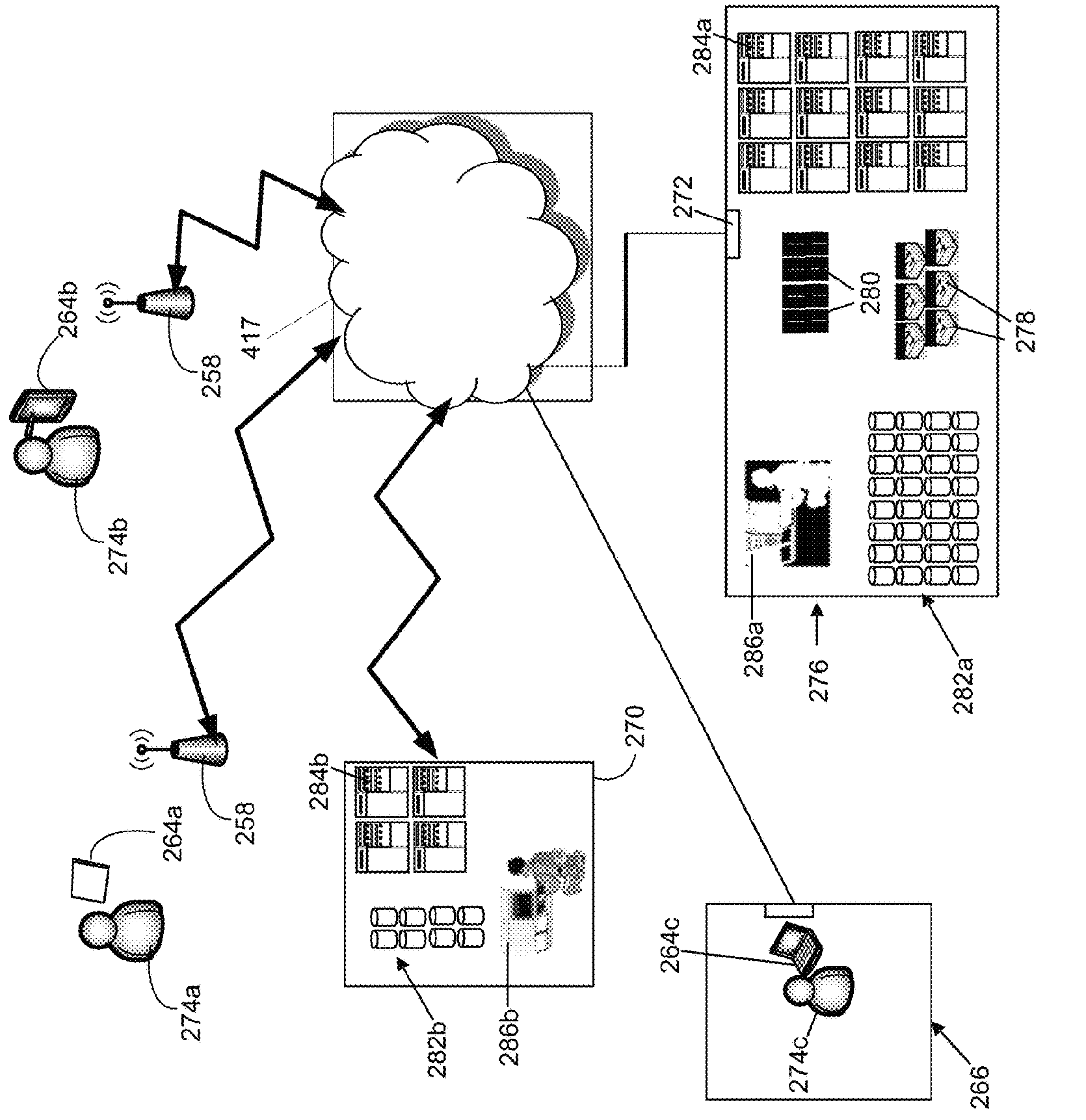
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
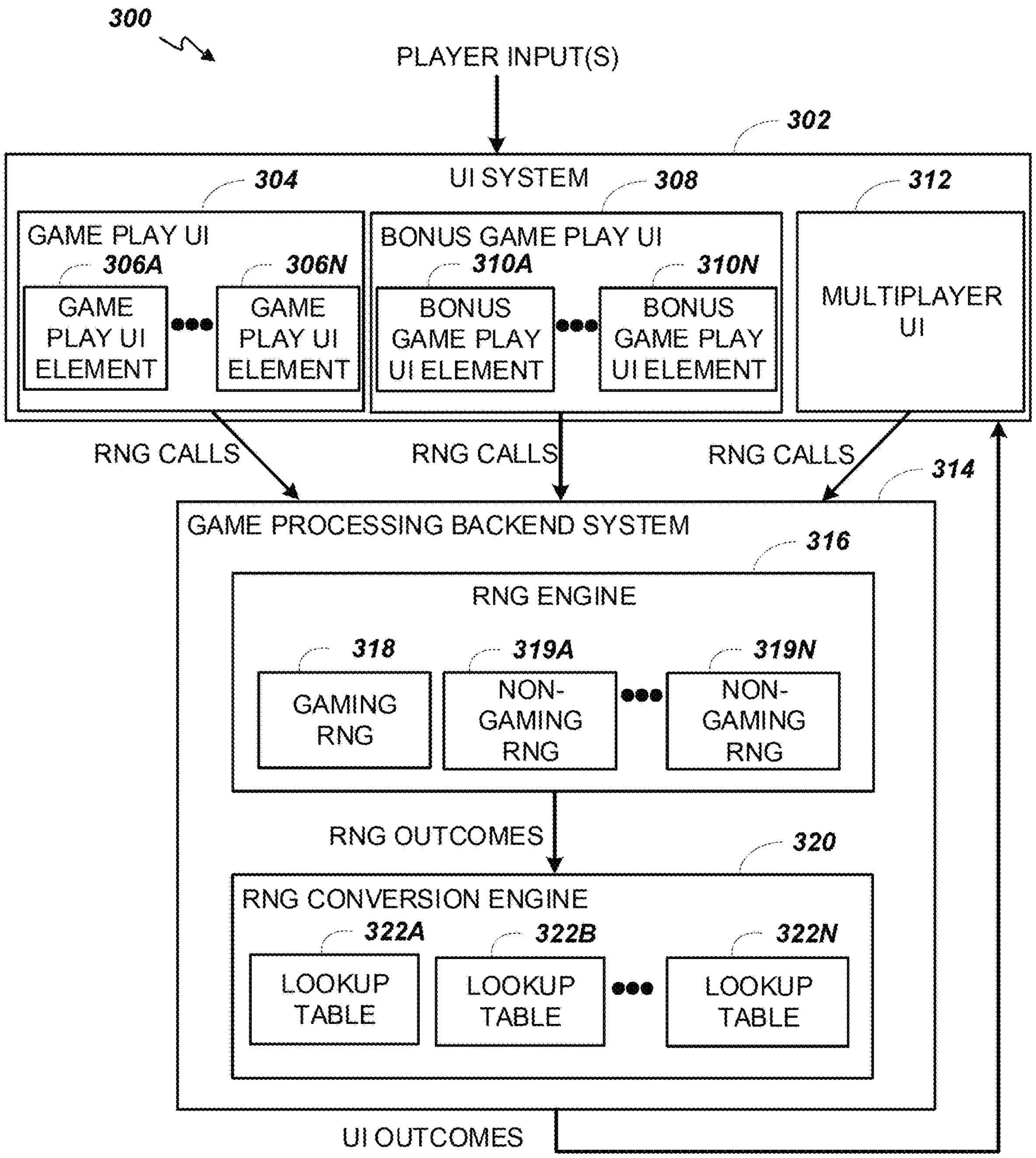
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

A brief description of electronic gaming reel games follows. Implementations described herein can be implemented in a gaming server 102 and/or gaming device 104A, 104B, 104C, 104X, 200 as described with reference to FIGS. 1 and 2. Thus, a gaming server 102 or gaming device 104A, 104B, 104C, 104X, 200 is an example of an electronic gaming device as described. The game processing backend system and graphical user interface system can be implemented using memory and one or more processors that are part of the electronic gaming device and/or part of a gaming system located remotely from the electronic gaming device. Depending on implementation, the backend system and graphical user interface system can be implemented by software executable on a CPU, by software controlling special-purpose hardware (e.g., a GPU or other graphics hardware for video acceleration), and/or by special-purpose hardware (e.g., in an ASIC), to process game play instructions in accordance with game play rules, determine outcomes in accordance with game play rules, and/or generate outputs (e.g., to one or more display screens and/or speakers).

Electronic gaming devices can incorporate implementations described herein into various types of reel games or other games. A reel game can be a base mode or feature mode (e.g., free game or bonus game mode). A reel game uses spinning reels and one or more reel windows, e.g., reel window 150 on a display screen 128 in FIG. 1.

A base mode includes play that involves a sequence of reel spins, reel stops and win determinations of the stopped reels. That is, a single play of a reel game can constitute a single complete game or wager, e.g., a single spin of the reels or a series of spins and reel stops which culminate in a final aggregate outcome.

A feature mode can, among other things, add the possibility of winning alternative payouts potentially involving different target volatility criterion than the base game. A feature mode typically does not require an additional wager, but certain feature modes may require additional wagers.

As shown in FIG. 1, the reel game may include a display 128 with a reel window 150. The reel window 150 is configured to display at least viewable portions of a set of reels associated with the reel window 150. For each of the reels, the viewable portion of the reel includes a plurality of positions for one or more instances of symbols from a symbol set. Thus, the game window 150 may display a matrix of one or more symbol positions containing one or more symbol instances on a display 128, and may be highlighted graphically to emphasize one or more reels, symbol positions and/or symbol instances within the reel window 150. The number of reels and dimensions of the reel window 150 depend at least on display and the game implementation employed.

In some arrangements, the reel window 150 displays y reels with x symbol positions visible to the player. This display of y reels with x symbol positions may be referred to as a reel array. Of course, different reels can have different counts of symbol positions and, in turn, symbol instances possible.

Figure 4:
FIG. 4 illustrates a bank of electronic gaming machines employing implementations disclosed.

For example, a reel window 150 displays 5 symbol positions for a first reel, a second reel, a third reel, a fourth reel, and a fifth reel. Such a configuration can be described as a 5-5-5-5-5 configuration. For a typical game in base mode, a reel window 150 may display a 5×3 configuration-five reels per window, with three symbol positions showing in the window for each of the reels. A configuration like that is shown in FIG. 4 and can be described as a 3-3-4-4-4 configuration.

Other game array configurations are possible. For example, more generally, the reel window 150 may accommodate a reel array that spans m reels in a first dimension and spans n visible symbol positions in a second dimension orthogonal to the first dimension, where the value of m can be 4, 5, 6, 7, 8, or some other number of reels, and the value of n can be 2, 3, 4, 5, 6, or some other number of symbol positions.

Typically, the m reels are arranged horizontally in the reel window 150 from left-to-right, with the m reels spinning vertically and the reel window 150 showing symbol positions of each of the visible portions of the respective reels. Alternatively, the m reels are arranged vertically in the reel window 150 from top-to-bottom, with the m reels spinning horizontally and the reel window 150 displaying symbol positions of each of the portions of the visible respective reels. Alternatively, a reel window 150 can have other configurations.

For each of the reels, a reel strip includes z total positions along a one-dimensional strip of symbol positions, where z depends on implementation. For example, z may be 30, 70, 100, 140, or some other number of positions. Different sets of reels can be used for a base mode, feature mode or other gaming mode. For example, for a feature mode, more valuable symbols, such as a WILD symbol or a SCATTER symbol, can be added to the reels to trigger or enhance play of the feature mode. The value of z can be the same or different for different reels (thus, different reels can have different numbers of symbol positions).

In some implementations, the configuration of the symbol instances at the symbol positions of the reel strips for the reels of a reel game is fixed after the reel mode is initiated (e.g., boots), although limited reconfiguration operations may be permitted. In other implementations, the configuration of the symbol instances at the symbol positions of the reel strips for the reels of a reel game can change dynamically after the reel mode is initiated. The dynamic change could depend on bet amount or some other factor(s), for example.

The symbol set for the reels may comprise various types of symbols. For example, symbol set may comprise a plurality of symbols, including a plurality of game symbols, a plurality of trigger symbols and a plurality of special symbols. The symbols can be static or animated. Depending on the application, the symbol set for the reels may comprise one or more special symbol types, at least one JACKPOT symbol type, a WILD symbol type, some number of picture symbol types, some number of game/low symbol types, and a SCATTER symbol type (which may, for example, trigger bonuses).

By way of an illustrative example, the symbol types may be various lower-value symbol types of different denominations (shown as other animals, numbers, card values), a WILD symbol (shown as a stylized WILD), a SCATTER symbol, a symbol for free games (e.g., infinite free games) and include a high-value symbol (shown as a Buffalo symbol). The SCATTER symbol is a dynamic symbol that is resolved to one of several different SCATTER symbol types (shown as a regular coin, a super coin, or one of several different jackpot coins) upon a spin. Alternatively, other and/or additional symbol types can be used. One or more "WILD WILD" symbol combinations are utilized in some instances to trigger a feature mode. Various jackpot symbols and combinations thereof may be used to trigger wheel award progressive and other progressive multipliers, for example.

A symbol set for the reels can also include other and/or additional symbols. In general, for a given type of symbol, one or more instances of the symbol can appear in a reel strip, but games can have different constraints on symbol placement. The symbol set can be the same or different between a game in the base mode and a game in the feature mode. Some types of symbols are dimmed out (not active at times).

Depending on context, the term "symbol" can indicate a symbol type or a symbol instance. In general, a WILD symbol instance can substitute for any other symbol (except, in most implementations, a SCATTER symbol or jackpot symbol) when determining win conditions along pay lines. In general, a SCATTER symbol instance can contribute to a win condition even if it is not on the same pay line as another scatter symbol. In some implementations, a win condition depends on a game instance count of a SCATTER symbol that occurs anywhere within a reel array, regardless of where they land within the reel array.

As in a reel game with physical reels, the reels of a reel game on a display 128 "spin" graphically through a reel window 150 on the display screen 128 to render partially visible the reel strips, when a player actuates a "spin" or "play" button, which acts as a "handle pull" event. The backend system randomly selects symbol positions of reel strips at which to stop the reel strips for the respective reels, and the respective reels stop at the selected symbol positions of the reel strips, with some number of symbol positions visible in the game window for each of the reels. For example, for a given reel, the backend system to the game machine generates a random number and determines a symbol position or symbol instance at which to stop the reel strip of the reel using the random number (e.g., with a lookup table). The backend system to the game machine may generate a different random numbers for the respective reels that are spun. In this way, the backend system to the game machine can determine which symbol positions (and, in turn, symbol instances) of the respective reels are visible in the reel window 150 on the display screen 128.

In other scenarios, symbol instances visible in a reel window 150 can be "transferred" or moved (e.g., drag and dropped by the player's touch) from another reel window 150 when certain conditions are satisfied. For example, symbol instances can be graphically transferred or otherwise added to the reel window 150 for a feature mode game from a base mode game upon the occurrence of certain conditions for the base mode game.

Generally, the backend system may determine various outcomes and perform operations for various types of games in the base mode and feature mode. For example, for various types of events, the backend system, e.g., as in FIG. 3, uses an RNG (which can be a cryptographic RNG or PRNG) to generate a random number and that maps the random number to an outcome using a lookup table. This series of operations is generally referred to as an RNG operation. A graphical user interface of the gaming device can then output a display or other indications of those outcomes and perform operations.

FIG. 3 shows examples of lookup tables 322A-322N. These lookup tables 322A-322N may comprise weighted tables.

Generally, a lookup table can be implemented to assign probabilities to different possibilities, in order for one of the different possibilities to be selected using a random number. Different possibilities are represented in different entries of a lookup table. The probabilities for different possibilities can be reflected in threshold values. By way of example, for a random number RND, generated by an RNG, in the range 0<RND<=100, with four possibilities, 0<RND<=30 for entry 1, 30<RND<=65 for entry 2, 65<RND<=92 for entry 3, and 92<RND<=100 for entry 4). The threshold values can represent percentages or, more generally, sub-ranges within the range for a random number.

In some implementations, the threshold values for a lookup table are represented as weights (sometimes referred to as count values) for the respective entries of the lookup table. For example, the following table shows weights for the four possibilities described above:

TABLE 1

| Exemplary Lookup Table | |
|---|---|
| Weight | Entry |
| 30 | <value 1A; value 2A . . . > |
| 35 | <value 1B; value 2B . . . > |
| 27 | <value 1C; value 2C . . . > |
| 8 | <value 1D; value 2D . . . > |

The backend system can use a random number, generated between 1 and the sum total of the weights, to select one of the entries in the lookup table by comparing the random number to successive running totals. In the example shown in Table 1, if the random number is 30 or less, the first entry is selected. If the random number is between 30 and 65, the second entry is selected, and, if the random number is between 65 and 92, the third entry is selected. Otherwise, the last entry is selected.

The lookup table threshold values for a lookup table can vary dynamically (e.g., depending on bet amount). The lookup table threshold values can also be fixed and predetermined. Or, a lookup table can be dynamically selected (e.g., depending on bet amount, depending on another factor) from among multiple available lookup tables. Different choices or parameters during game play can use different lookup tables. Or, different combinations of choices or parameters can be combined in entries of a given lookup table.

In general, after reels have stopped (landed) in a reel window 150, any win conditions can be determined and selected win amounts can be awarded to the player (e.g., credited to the player's credit balance). In some examples, win conditions depend on a count of particular symbol instances in a reel window 150.

In other examples, win conditions are defined as combinations of symbol instances along pay lines (also called win lines) across at least a visible portion of a reel array on a display screen 128. A pay line is commonly traversed from one side of the reel window 150 to the opposite side of the reel window 150 (e.g., left to right), using one symbol instance per reel along the pay line as part of possible combinations of symbol instances. When a certain combination of symbol instances appears along a pay line, a win amount corresponding to that combination of symbol instances and that pay line is awarded for that round of play.

Win amounts can vary according to the combination of symbol instances and according to the particular pay line along which the combination of symbol instances appears. Win amounts are typically determined according to a pay table, where the pay table assigns the various combinations of symbol instances and pay lines that may occur (win condition possibilities). The win amount for a round of play may be a fraction of an amount wagered for that round of play for certain win conditions. For other win conditions, the win amount may be much larger than the amount wagered.

The number of pay lines and base credit cost to play depends on implementation. There can be 2×, 3×, 4×, and 5× bet multipliers. Multipliers can also appear as symbols in reels. Alternatively, there could be higher bet multipliers, different credit options, and/or a different number of pay lines.

Depending on the implementation, symbol instances along a pay line can be counted in different ways. For example, when evaluating a win condition along a pay line, only symbol instances along the pay line in adjacent reels are counted. On the other hand, when evaluating a win condition along a pay line, symbol instances along the pay line in any reel can be counted, even if the reels are not adjacent. For a given pay line, only the highest-paying combination of symbol instances is awarded. Alternatively, for a given pay line, all possible combinations of symbol instances are awarded, in the aggregate. A given symbol instance (e.g., wild symbol) is counted only towards its highest-paying combination in a given pay line. Alternatively, a given symbol instance can be counted towards multiple combinations in a given pay line.

An award can alternatively be determined according to a "ways" approach. This approach is sometimes referred to as a "ways evaluation." For a ways evaluation, each possible path through designated (active) symbol display position(s) of the respective reels provides a way to win. A path is traversed from one side of the reel array to the opposite side of the reel array (e.g., typically left to right), using one symbol instance per reel along the path. For one symbol instance per reel in a combination, any symbol instance displayed at an active symbol display position for a given reel in the reel array can be used to form a symbol instance combination with any symbol instance displayed at an active display position of each of the other reels. The designated (active) symbol display positions for the respective reels can be pre-defined and static. For example, the designated (active) symbol display positions for each reel can be all of the symbol display positions enclosed in a reel window 150 for the reel. Or, the designated (active) symbol display positions for the respective reels can change, e.g., depending on a bet amount.

As a result, the total number of ways to win is determined by multiplying the number of active display position(s) of each reel. For example, for five reels each showing four symbol instances at active display positions in a reel window 150, there are $4^5=1024$ ways to win for all-ways evaluation. As another example, for five reels, with the first and second reels each showing three symbol instances and the remaining reels each showing four symbol instances at active display positions in the reel window 150, there are $3\times3\times4\times4\times4=576$ ways to win for all-ways evaluation.

A player can choose a bet denomination (e.g., one cent, two cents, five cents) or use a default bet denomination for a base reel game. The player can also choose a bet amount (e.g., different amounts of credits) or use a default bet amount. The bet amount may affect the number of reels that are selected for all-ways evaluation-from one reel up to five reels, depending on the bet amount. The player can also choose a bet multiplier (e.g., 1×, 2×, 3×, 4×, 5×) or use a default bet multiplier (e.g., 1×). Alternatively, other bet settings, evaluation approaches, etc. can be used.

The player initiates a spin for the base reel game (e.g., pushing a spin button). The spin uses the bet denomination, bet amount, and bet multiplier in effect (either default or selected by the player), assuming credits are sufficient in a credit meter. The credit meter decreases by the bet size.

In one example, for the spin of the reels in the base mode, a check may be made whether a feature mode is triggered. In particular, a random number may be generated, and the random number is mapped to an outcome (i.e., that the feature mode is triggered, or that the feature mode is not triggered) using a lookup table. The lookup table that is used can depend on the bet amount. In this example, as the bet amount increases, the feature mode is more likely to be triggered, as reflected in weights for the possible outcomes in different lookup tables for different bet amounts. Alternatively, the feature mode can be triggered in some other way, e.g., by the occurrence of a game element, like the occurrence of a designated or predetermined symbol or set of symbols, or by the occurrence of a non-game occurrence.

As discussed, a feature mode may be awarded or triggered in an electronic gaming device. The feature mode may improve the technology of the electronic gaming device with the additional elements of chance, e.g., a Cash-on-Reel (COR) feature. The feature mode can utilize a controls, different sets of reels, display screens, symbols, etc. than the base mode does in its normal operation.

Alternatively, the feature mode can reuse or reconfigure at least some of the reels, display screens, symbols, etc. of a base reel game. The feature mode can be started in response to satisfaction of a trigger condition. For example, the feature mode can be initiated upon the occurrence of some defined combination of symbol instances, or a threshold count of certain symbol instances in one or more sets of reels. Alternatively, the feature mode can be triggered in some other way (e.g., randomly).

In some implementations, if at least a threshold count (e.g., three or more) of instances of a scatter symbol (coin, super coin, or jackpot) land in any position, a free games feature may be triggered. In a free game mode, the player is prompted to start the free games feature, and a transition to the free games feature occurs.

In one example, once a free games feature starts, the free games feature may continue without an input event. In other exemplary alternatives, one or more spins of the free games feature may be started or initiated in response to a user input event. The free games feature continues until all free games (spins) have been used. The number of free games depends on the count of instances of a scatter symbol that have landed to trigger the free games feature. The number of free games can be increased if the free games feature is "re-triggered" from within the free games feature.

The outcome of the spin is then determined using all-ways evaluation, generally as described above for the base reel game. Alternatively, outcome evaluation can be performed using a different approach for a spin of the free games feature. In any case, after the outcome evaluation for a spin, any credits from winning combinations of symbol instances are shown in a win meter. The free games feature continues in a cycle of spin/stop/outcome evaluation until there are no more free games (spins). After the outcome evaluation for all spins of the free games feature, the total from the win meter is added to a credit meter and the free game feature reverts to the base or other game mode.

Referring now to FIG. 4, gaming machines, devices, and/or systems, such as the gaming machine 404D, may also be arranged in a bank of gaming machines 400. The gaming machines, devices and/or systems may be configured to control an outcome volatility using multiple lookup tables associated by reel and, in turn, allow effective use of credit values or other benefits that are overlaid on selected symbols in a feature mode. Additionally, the reel array in the reel window 150 (as in FIG. 1) may be enlarged to adjust a targeted volatility. These controls on the feature mode permit an outcome that necessarily satisfies one or more target thresholds such as a targeted volatility, or one or more target volatility criteria or parameters.

By way of example, the feature mode may be conducted as a spin in the game of the base mode. In another example, the feature mode may be conducted separate from a free game mode. In some examples, the feature mode may result in awards of at least a minimum amount for a way evaluation of the visible symbol instances. Alternatively, the feature mode may occur for a spin in another supplemental mode that may be a different process type.

In an illustrative implementation, a main display 128 displays symbols 414 selected by the game controller 202 in a plurality of groups of symbol positions 412, representing a plurality of reels or set of reels, e.g., a portion of one of the plurality of reels or set of reels is shown as reel or reel strip 430. Each group of symbol positions 412 represents a reel or reel strip.

In certain implementations, some reels (e.g., reels 428 (reel 1) and 430 (reel 2)) may include game symbols 414 and/or trigger symbols (e.g., similar to the WILD symbols 740 in FIG. 7), and a plurality of other reels (e.g., reels 432, 434 and 436 (reels 3-5, respectively)) may include the special symbols 418, along with game symbols 414. In such cases, reels 428 and 430 (e.g., reels 1 and 2) may also include trigger symbols, e.g., WILD symbols, while reels 432, 434 and 436 (e.g., reels 3-5), may be without WILD symbols. That is, in one implementation, the trigger symbols, e.g., WILD symbols, will appear only in the reel strips for reel 428 and reel 430, the first and second reels, respectively.

An instance of a trigger symbol, e.g., WILD symbols, along a path can be treated as or substitute for any other symbol, except a jackpot or SCATTER symbol. A WILD symbol may be replaced with a 2× multiplier or 3× multiplier (similar to 3× multiplier 1048 in FIG. 10), or stay or remain a WILD symbol during a spin using a RNG operation to select symbols with one or more lookup tables. Such a selection can vary based on the bet amount, which may vary the one or more lookup tables.

Referring still to FIG. 4, the game controller 202 of FIG. 2A of the game machine 404D may, among other things, also determine one or more of: (a) an award to be paid based on data in memory 208; (b) if a condition is met, e.g., based on symbol instances displayed on the main display 128, based on a predetermined number of times a game has been played, or based on a predetermined number of reel spins taken place as monitored by a timer/counter, and/or (c) whether to grow or increase the plurality of symbols 414 to be displayed on the main display 128. In some implementations, if reels 428 and 430 (e.g., reels 1 and 2) display trigger symbols, e.g., WILD WILD symbols (like shown in FIG. 7), the processor 204 may reference a random weighted table to determine if reels 432, 434, and 436 may grow or expand the number of symbol positions 412 and the number of symbols positions 412 to grow or expand.

Once the feature mode is triggered and any reel expansion has occurred, the feature mode initiates in one implementation a backend process that associates a subset of reels with a lookup table to control the volatility of the feature mode. In some implementations, the feature mode may be triggered by means other than the WILD WILD symbol combination on reels 428 and 430 (reels 1 and 2), such as discussed above.

In some examples, the likelihood of triggering or initiating of the feature mode may change with the bet amounts. For example, increases in the bet amount may increase the likelihood of occurrence of the feature mode. Use of lookup tables to account for the effects of different bet amounts can be used to weight the likelihood triggering or initiating of the feature mode for changing for the different bet amounts. Of course, the likelihood of triggering or initiating of the feature mode may change based on game or non-game criteria.

Figure 6:
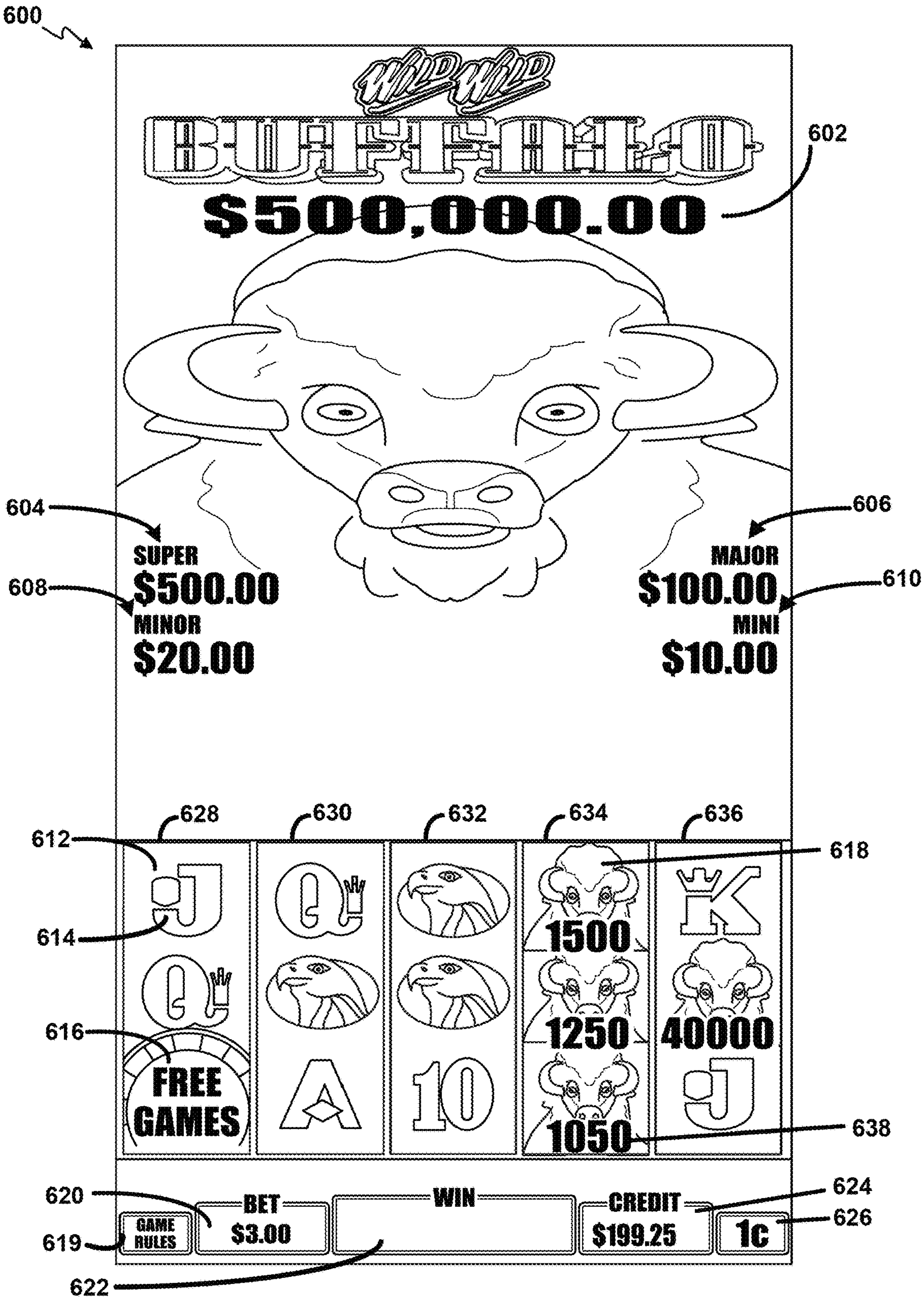
FIG. 6 illustrates an exemplary first graphical user interface on a gaming device according to the illustrated implementations.

In some implementations, when the game controller 202 of FIG. 2A selects trigger symbols, e.g., WILD symbols, to be displayed in both reels 1 and 2, the game controller 202 initiates a feature mode where special symbols 418 on one or more reels are adjusted based on an association with or linked to multiple lookup tables that are employed to meet one or more target thresholds such as a target volatility criteria for an outcome in the feature mode. Each special symbol 418 is overlaid by credit value symbols, e.g., with credit values 638 overlaid on a special symbol 618, as shown in FIG. 6 and similarly shown in FIGS. 7-10, based on the associated lookup table corresponding to a respective reel.

For example, in the gaming machine 404D, the processor 204 (of FIG. 2A) assigns a plurality of special values or credit values to a plurality of special symbols 418. In some implementations, the memory 208 (of FIG. 2A) or modules associated with memory 208, e.g., a symbol data memory module, stores the plurality of values to be assigned. An example special symbol 418 is a Buffalo symbol, as shown in FIGS. 6-10. Of course, the special symbols 418 may take other forms, including various prizes and comps.

In the feature mode, if a special symbol 418 is displayed or "lands" on a displayed symbol position of reel 432 (i.e., reel 3), a player may be paid at least the credit value shown on the special symbol 418 (i.e., the cash on the reel). In some cases, special symbols 418 may land as a stack with at least two special symbols 412, as shown by the consecutive Buffalo symbols 418 in reel 434 (i.e., reel 4) in FIG. 4, but they may be stacked in other numbers of special symbols 418, like a stack of two or five special symbols 418, for example. In some implementations, the feature mode with enhanced credit values to be awarded may be easily discernable using an improved user interface via the stacking of the special symbols (e.g., Buffalo symbols) on reels 3, 4 and 5, and may also allow for multiple credit values and jackpots to be awarded in a single spin. In some implementations, if the symbol types land in the feature mode in consecutive feature reels 432, 434 and 436 after the display of trigger symbols (e.g., the WILD symbols 740) on non-feature reels 428 and 430, the player is awarded the displayed credit values. By way of a further example, if special symbol types land or are selected for display on feature reels 432 and 436, but not feature reel 434, the player is awarded only the displayed credit values on reel 432.

In some implementations, when the feature mode is triggered, the game controller 202 of FIG. 2A designates or assigns different credit values to different reels based on the associated one or more lookup tables. For example, the game controller 202 assigns a value from the lookup table of 500 credits, 1000 credits, and/or 1500 credits to the special symbols 418 on a predetermined reel, for example, reel 432 (i.e., reel 3). Similarly, the game controller 202 assigns a value from the lookup table of 1000 credits, 1500 credits, and/or 2500 credits to the special symbols 418 on a predetermined reel, for example, reel 434 (i.e., reel 4), and 2500 credits, 5000 credits, 10000 credits and/or 40000 credits to the special symbols 418, along with minor and/or major jackpots on a predetermined reel, for example, reel 436 (i.e., reel 5, which, in this implementation is the last reel of the plurality of reels). A variety of other credit values and/or benefits could be assigned from the lookup table for each special symbol 418 on a given feature reel. In some implementations, the credit values designated for each special symbol 418 in each reel has gradually larger credit values across the feature reels 432, 434 and 436. Other credit value allocations across the reels are contemplated.

By way of another example, the credit pays for WILD WILD Buffalo may employ a bet multiplier that may include values such as 1, 2, 3, 4, 5, and/or 10. In this example, the WILD WILD Buffalo game allows all special symbols (Buffalo symbols):

on reel 3, to provide overlaid credit values equal to one or more of 100 credits times the bet multiplier, 150 credits times the bet multiplier and 250 credits times the bet multiplier, on reel 4, to provide overlaid credit values equal to one or more of 250 credits times the bet multiplier, 500 credits times the bet multiplier, 1000 credits times the bet multiplier and 5000 credits times the bet multiplier, and on reel 5, to provide overlaid credit values equal to one or more of 1000 credits times the bet multiplier, 2000 credits times the bet multiplier, 5000 credits times the bet multiplier and 10000 credits times the bet multiplier.

Overlaid jackpot awards for the "Major" jackpot or the "Minor" jackpot may be employed in some examples.

In addition to controlling outcome volatility, configuring the feature mode in this manner also enhances the visual cues for the player and the value of the feature game by offering a variety of win opportunities. In the event that a player does not land a special symbol 418 on reel 432 (i.e., reel 3) and feature mode terminates, the player still may have trigger symbols (e.g., WILD symbols) on reels 1 and 2 and may win at least a 3-of-a-kind win. In some cases, significant wins remain possible.

Figure 5A:
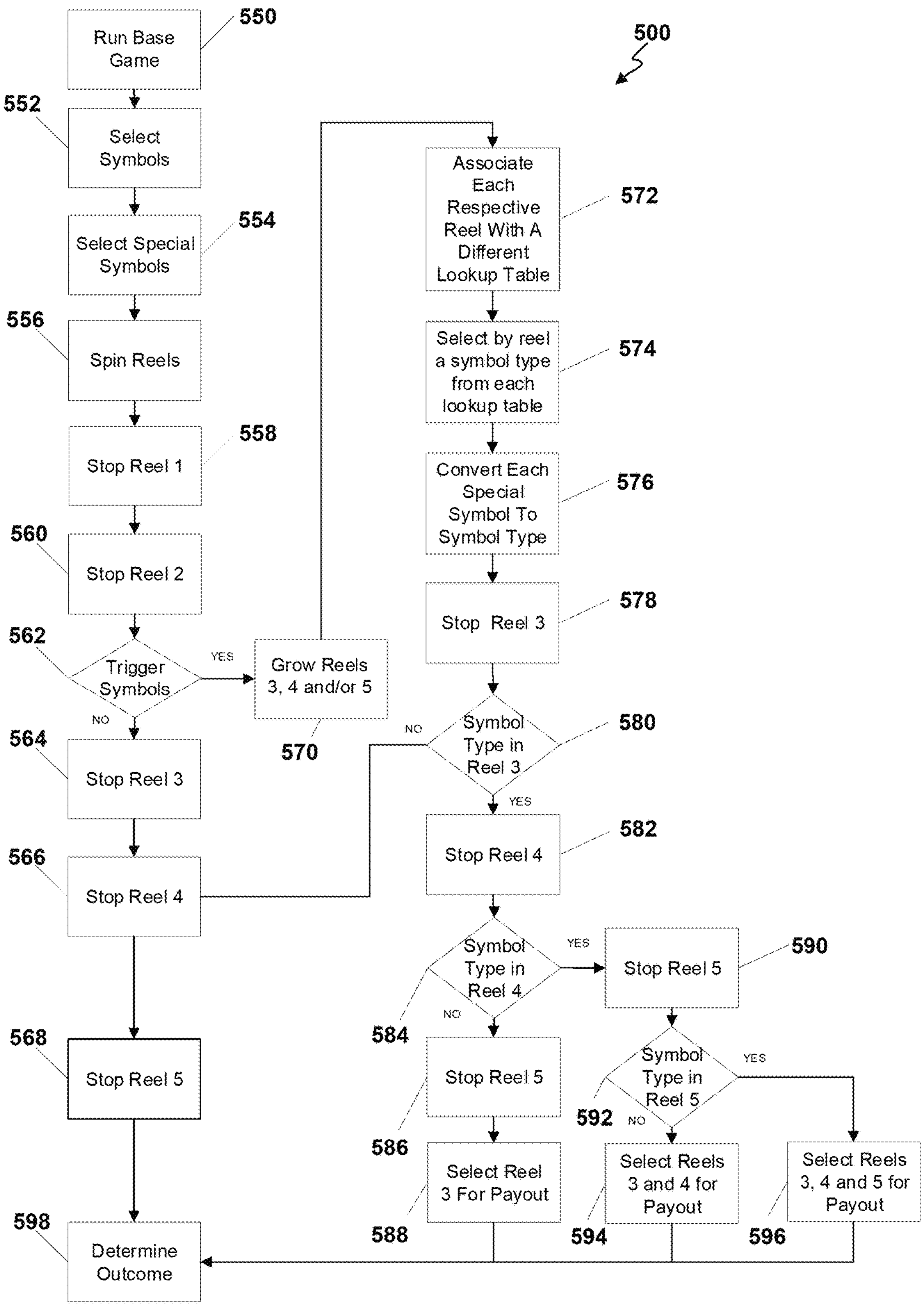
FIG. 5A illustrates one backend process for an exemplary technique for a volatility control process according to the illustrated implementations.
Figure 5B:
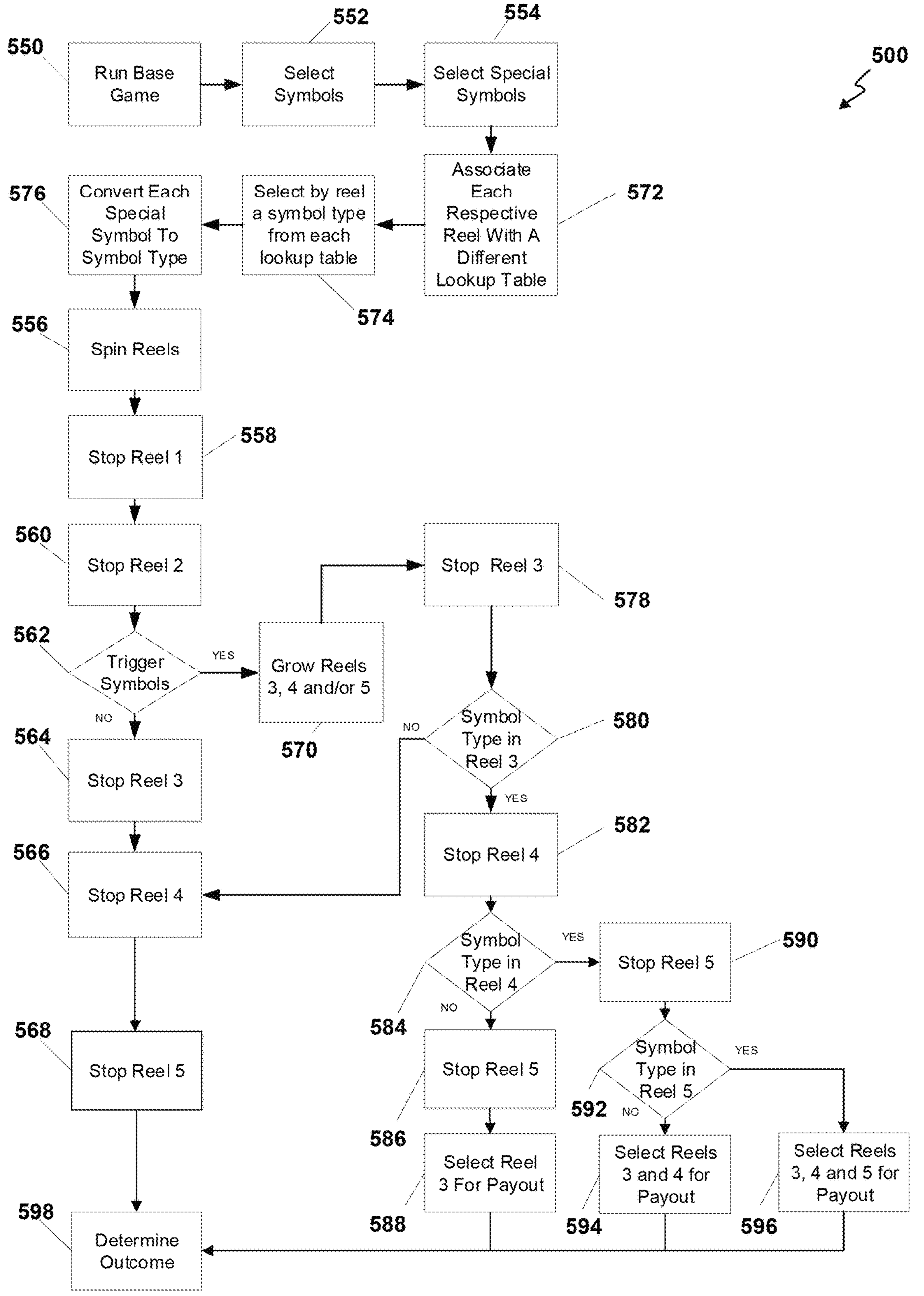
FIG. 5B illustrates another backend process for an exemplary technique for a volatility control process according to the illustrated implementations.
Figure 5C:
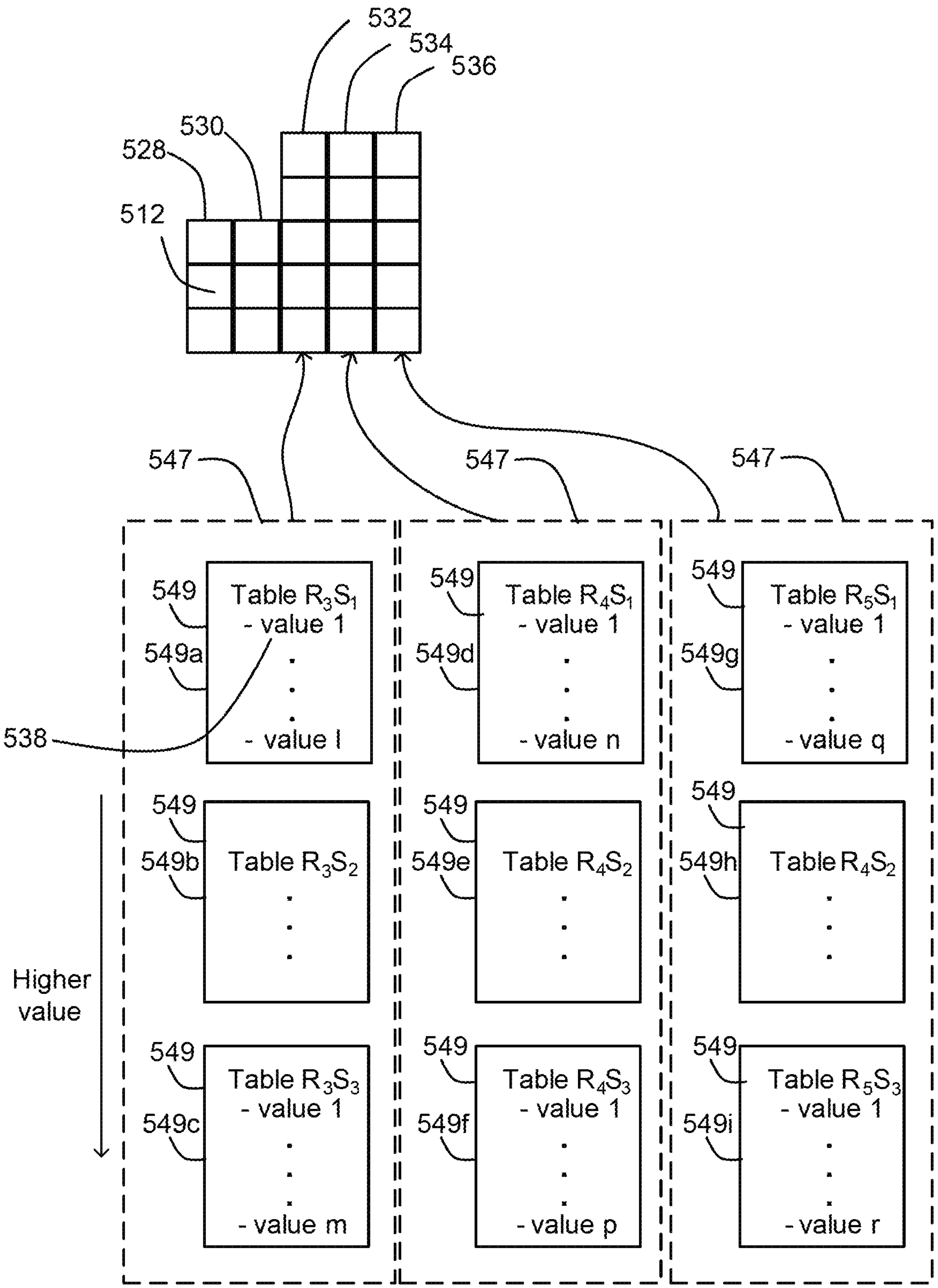
FIG. 5C illustrates a plurality of lookup tables employed in an exemplary technique for a volatility control process according to the illustrated implementations.

FIG. 5A and FIG. 5B are exemplary flow charts of a backend processes 500 for controlling outcome volatility using reel-specific associated lookup tables 547 in FIG. 5C. FIGS. 5A and 5B are similar. For the sake of brevity, FIG. 5A will be described in further detail, and the similar process blocks and reference numbers in FIG. 5B will not be separately described.

Backend process 500 may be performed in a gaming device, such as the gaming machine 404D of FIG. 4. While FIG. 5A is described from the backend perspective, it will be understood that one or more aspects of the backend process 500 can be appreciated from the UI frontend, which is illustrated, at least in part, in FIGS. 6-10. It should also be appreciated that this implementation describes a five reel configurations but other reel configurations are possible.

At block 550, when a player actuates button 236 or other player interfaces, the backend process 500 begins. A game controller (e.g., the game controller 202 of FIG. 2A for gaming machine 404D of FIG. 4) comprises a processor and a memory storing instructions, which when executed, causes the processor to initiate a base game.

At blocks 552 and 554, the game controller 202 selects a plurality of symbols from the symbol set for display in each of a plurality of symbol positions, e.g., symbol position 512, on the plurality of reels 528, 530, 532, 534, and 536 (e.g., reels 1-5) of FIG. 5C. The plurality of symbols comprise a plurality of game symbols (e.g., game symbols 414 of FIG. 4, such as A, K, Q, J, 10, 9), trigger symbols (e.g., trigger symbols 740 of FIG. 7, such as a WILD, or a multiplier symbol 1048 (e.g., ×3 symbol in FIG. 10), and special symbols (e.g., special symbols 418 of FIG. 4, such as a Buffalo head). The selection of the plurality of symbols may be made by one or more random numbers generated by a random number generator.

At block 556, the game controller 202 causes the main display 128 to display a spinning of the reels, and at least a portion of the symbol positions 412 of each of the reels or reel strips is displayed or visible to the player in reel window 150 of FIG. 1. In some implementations, the game controller 202 randomly determines or selects a plurality of stop positions thereby a plurality of symbols for a plurality of reels, reels 528, 530, 532, 534, and 536 (e.g., reels 1-5) of FIG. 5C, based on one or more random numbers generated by the random number generator 212.

At blocks 558 and 560, the game controller 202 displays a stopping of a plurality of the reels, for example, reels 528 and 530 (e.g., reels 1 and 2), and to display the plurality of symbols selected in blocks 552 and 554. Reels 528 and 530 are sometimes referred to as non-feature reels in some implementations. Reels 528 and 530 could be suspense stopped in sequence or in other sequences of stopping. Normally, reels 528 and 530 will be stopped before the other reels. In some implementations, stopping of two reels before the other reels can involve stopping other combination of reels, e.g., reels 528 and 536 (e.g., reels 1 and 5) may be stopped first. Also, if more than five reels are used for display in the reel window 150, for example, more than two reels could be stopped first for evaluation of trigger symbols that may trigger the feature mode.

At block 562, the game controller 202 determines if trigger symbols (e.g., similar to the WILD symbol 740 of FIG. 7) appear on the first two reels stopped, e.g., reels 528 and 530 of FIG. 5C, in this example. If the trigger symbols (e.g., similar to the combination of WILD WILD symbols 740 in FIG. 7) appear on each of the first two reels, then the game controller 202 advances, as discussed below with block 570, to determine if the remaining reels 532, 534 and 536 of FIG. 5C, e.g., reels 3, 4 and 5 in this example, should have additional symbol positions to grow or expand the visible symbol positions in the reel window 150 for reels 532, 534 and 536. The remaining reels 532, 534 and 536, e.g., reels 3, 4 and 5 in this example, are sometimes referred to as feature reels in some implementations.

If the trigger symbols (e.g., similar to the WILD symbol 740 of FIG. 7) are not selected to appear on both stopped reels, e.g., reels 1 and 2 in this example, then the game controller 202 proceeds, at blocks 564-568, to stop in a desired sequence the remaining non-stopped reels, e.g., reels 3, 4, and 5 in this example. That is, the backend process 500 proceeds at block 564 to stop reel 3 from spinning, followed by stopping reel 4 and followed by reel 5 from spinning at block 566 and block 568, respectively. Reels 532, 534 and 536 could be suspense stopped in sequence or other sequence of stopping, e.g., simultaneous stopping. The stopping sequence can be complemented with graphic and audio to enhance the visual and auditory cues channeled through the user interface for the player during the feature mode sequence. Once the reels 532, 534 and 536 have stopped, the game controller 202, at block 598, determines if a winning combination of symbols has been displayed.

If block 562 determines that the displayed symbols of the stopped reels 1 and 2 include trigger symbols (e.g., similar to the WILD symbols 740 in FIG. 7) or include some other predetermined symbol combination, the game controller 202, at block 570, determines if the remaining reels 532, 534 and 536 (e.g., reels 3, 4 and 5 in this example) or some other predetermined number of reels should have additional symbol positions (sometimes referred to as symbol display positions) grow or expand the number of symbol positions shown for the visible portion of reels 532, 534 and 536.

For example, in some implementations, the number of symbol display positions of reels 532, 534 and 536 that are visible may grow from four symbol display positions (like shown in FIG. 7) to five symbol display positions. In other implementations, the number of symbol positions of reels 532, 534 and 536 may grow from three symbol positions to five symbol positions. In some implementations, a reel expansion or growth may be an extended reel spin with graphical animation and sound to further engage the player's attention to the reels and aid the player with visual and audio cues during the feature mode. The number of symbol positions added may be based on a weighted table that associates the number symbol positions to be added with a weight that establishes the likelihood of an occurrence of an increase in the number of symbol positions. For example, a three symbol position reel displayed would have a higher likelihood of occurrence than a four symbol position reel displayed, and a four symbol position reel displayed would have a higher likelihood of occurrence than the a five symbol position reel displayed. Other weightings can be used for growing the number symbol positions displayed. Additionally, when the feature mode is triggered, the number of symbol positions of visible reels 532, 534 and 536 could grow in multiple directions, e.g. upward and downward. Reel growth could also include adding one or more entire new reels to this displayed, e.g., expanding from five reels to seven reels.

Referring to FIG. 5C and block 572 in FIG. 5A, the backend process 500 associates each respective feature reel, e.g., reels 532, 534 and 536, to at least one lookup table 547. Each lookup table 547 corresponds to at least one symbol type 549 (e.g., a single or stack of special symbols) of a plurality of symbol types assigned to each feature reel. Of course, the backend process 500 could associate a separate lookup table 547 for each symbol type 549 used to replace the special symbol 418 (as shown in FIG. 4) after the feature mode is triggered. When the special symbol 418 on a feature reel is replaced with the symbol type, the symbol type that has been assigned is also referred to as a converted symbol.

In some implementations, a symbol type may include a plurality of different symbols, and/or a symbol with a plurality of different or unique credit values. For example, in some implementations, different symbol types may include different symbols, such as a Buffalo symbol, which may be different from an Elk symbol, which may also be different from a Tarzan symbol. In other implementations, different symbol types may include the same symbol (e.g., a Buffalo symbol) with different credit values, parameters, and/or prizes. For example, the backend process 500 may use lookup tables (e.g., the lookup table 547) to generate or randomly select different credit values for the same symbol (e.g., Buffalo symbol) to constitute or compose different symbol types or different converted symbols. For another example, the backend process 500 may also generate different multiplier values associated with the same symbol (e.g., Buffalo symbol), thus composing different symbol types or different converted symbols. For yet another example, the backend process 500 may also randomly or selectively associate different jackpot prizes with the same symbol (e.g., Buffalo symbol) to constitute or compose different symbol types or different converted symbols. For still another example, the backend process 500 may use one or more combinations of lookup tables (e.g., the lookup table 547) to generate or randomly select different credit values for the same symbol (e.g., Buffalo symbol), random generations of multiplier values associated with the same symbol (e.g., Buffalo symbol), and random associations of different jackpot prizes with the same symbol (e.g., Buffalo symbol), to constitute or compose different symbol types or different converted symbols. For yet another example, the backend process 500 may generate or randomly select values, parameters, and/or prizes of the same symbol (e.g., Buffalo symbol), to constitute or compose different symbol types or different converted symbols that may affect the payout for a symbol during the feature mode.

As discussed above, multiple lookup tables may be linked to the special symbol types, whether stacked or single special symbols, on at least one reel strip by including multiple symbol types on a reel strip to reduce randomly generating multiple game outcomes before finding a game outcome satisfying one or more target thresholds, thus reducing latency, lowering the intensity of data processing and thereby draining less device resources for the game. As shown in block 574, the game controller 202 randomly selects the symbol types 549 from the corresponding lookup table for each feature reel 532, 534 and 536 (e.g., reels 4, 5 and 6) in this example based on one or more random numbers, e.g., generated by the random number generator 212 (of FIG. 2A). In an implementation, at least one special symbol 418 with a credit value 438, as shown in FIG. 4, is associated with at least one symbol type 549 in FIG. 5C, and is selected for display on a visible portion of at least one reel strip (e.g., 532, 534 and 536) that will meet or satisfy the volatility targeted.

In some implementations, each reel 532, 534 and 536 has its own lookup tables 547 in FIG. 5C for each of their respective special symbol types 549. Each of the respective lookup tables 547 is associated with one or more symbol types or credit value symbols 549 since each reel 532, 534 and 536 may have varying credit ranges. The different one or more symbol types or credit value symbols 549 (i.e., the special symbol 418 with a credit value 438 overlaid as shown in FIG. 4) are placed on the reel strip as single symbols or in stacks of 2, 3, or 5 special symbols. In this regard, the selection of stacks is provided on the user interface for the player to visualize the available credit values to win in the feature mode.

Additionally, the lookup table 547 may only allow a single symbol type 549 (e.g., the high pay credit symbols) to be included in any symbol stack to reduce the overall liability when the whole stack is to be among the determined win outcomes. Similarly, more high pay symbol types or credit value symbols 549 could be added to a reel strip, or within the symbol stacks, to achieve a minimum target volatility.

Each special symbol (e.g., the special symbol 418 in FIG. 4) on a respective reel would reference a different, associated lookup table 547 corresponding to the symbol type 549 with different credit value ranges. The associated lookup table 547 uses logical links to symbol types 549 on each feature reel strip and transforms special symbols 418 to be overlaid with credit values 438, as shown in FIG. 4. The lookup table 547 may also comprise an array, linked tables, a linked list, a tree, or another structure for data. The lookup tables 547 may comprise fields for the respective symbol types 549 corresponding to the associated reel strip. The field for a given symbol position can store a logical link to a next symbol type 549 to be selected after selection of that first symbol type 549, in addition to storing an indication of the outcome associated with each symbol type 549. The lookup table for the associated reel strip may aggregate information in a singular structure.

For a given one of the symbol types 549, a lookup table 547 may include an entry for a corresponding weight, an outcome, and a logical link to a subsequent symbol type 549 that may be selected for the reel in subsequent spins. The logical link in the lookup table 547 may include an outcome in a different table that maps different symbol types to different outcomes.

The lookup tables 547 may also be logically linked to other lookup tables 547 for symbol types 549 corresponding to other reel strips. For example, for a given reel strip, a lookup table 547 can include multiple entries for symbol positions of the reel strip. The logical links may be symbol type 549 identifiers. The associated lookup tables 547 may be connected to the symbol type 549 by pointers, logical references, or some other types of logical links. Each lookup table 547 may include entries with weights for the respective symbol type 549 of the reel strip, and may be used when selecting one of the symbol type 549 of the reel strip.

The association of the lookup tables 547 by reel for each symbol type 549 efficiently organizes the possible outcomes per reel for each spin. In this regard, several methods of decoding an RNG outcome may be used in the backend process 500. For example, in some "without replacement" implementations, entries that have been used or selected are removed from the table. This technique simulates sampling of symbol types 549 without replacement of the symbol types on the reel for iterative spins of a reel using a reel strip with multiple symbol positions 512 as shown in FIG. 5C. In general, lookup tables 547 include, for the respective symbol types 549, logical links to the symbol type 549 of the reel strips to be selected or used in subsequent iterations or spins. After the subsequent spin, the previous symbol type 549 selected alternatively can be removed, may be given a lower weight, or be replaced with another symbol type 549 to account for the previous selection on the corresponding reel strip. For another example, in some "with replacement" implementations, the same table or sets of lookup tables are reused without removing any of the entries that has been used. For yet another example, in other implementations, some entries of some tables are replaced, while other entries of other tables are not replaced. In some implementations, the tables in which entries are replaced may be predetermined, while other tables in which entries are replaced may be randomly selected.

For further context, in some implementations, for any given symbol type 549, there may be multiple credit values 538 assigned to that symbol type 549 in the lookup table 547 assigned to a given reel, e.g., 532, 534 or 536. This allows for different credit values 538 (e.g., values 1 to m in lookup table 549*c* of FIG. 5C) for the same symbol type 549 to be pulled from a single lookup table 547, which may add variety for the player on each reel. Alternatively, multiple lookup tables 547 (for example, two lookup tables 547 or more) could be associated to a single symbol type 549. Additionally, a range of credit values may be assigned to each symbol type 549 for different ones of the plurality of reels (e.g., 530, 532 and 534).

By way of further illustration and still referring to FIG. 5C, for reel 532 (i.e., reel 3), credit values 538 for a first symbol type 549*a* ($R_3S_1$) for reel 532 (i.e., reel 3) are chosen randomly from a lookup table 547 for reel 532 (i.e., reel 3) and the first symbol type 549*a* ($R_3S_1$). Credit values for a second symbol type 549*b* ($R_3S_2$) for reel 532 (i.e., reel 3) are chosen randomly from lookup table 547 for reel 532 (i.e., reel 3) and the second symbol type 549*b* ($R_3S_2$). Credit values for a third symbol type 549*c* ($R_3S_3$) for reel 532 (i.e., reel 3) are chosen randomly from lookup table 547 for reel 532 (i.e., reel 3) and the third symbol type 549*c* ($R_3S_3$). The first symbol type 549*a* ($R_3S_1$) for reel 532 (i.e., reel 3) would have the lowest range of credit values. The third symbol type 549*c* ($R_3S_3$) for reel 532 (i.e., reel 3) would have the highest range of credit values. The second symbol type 549*b* ($R_3S_2$) for reel 532 (i.e., reel 3) would have credit values in a range between the lookup tables 549*a* and 549*c*, respectively, for the first symbol type 549*a* ($R_3S_1$) and third symbol type 549*c* ($R_3S_3$) for reel 532 (i.e., reel 3). In some implementations, when the special symbols (e.g., Buffalo symbols) on reel 532 are in stacks, the stacks of special symbols are changed to the second symbol type and/or the third symbol type, while single special symbols are changed to the first symbol type. As an example, the stacks of special symbols on reel 532 are populated sequentially with values or entries drawn from lookup table (the third symbol type 549*c* ($R_3S_3$)), and the single special symbols on reel 532 are populated sequentially with values or entries drawn from the lookup table (the first symbol type 549*a* ($R_3S_1$)).

For reel 534 (i.e., reel 4), credit values 538 for a first symbol type 549*d* (MO for reel 534 (i.e., reel 4) are chosen randomly from a lookup table 547 for reel 534 (i.e., reel 4) and the first symbol type 549*d* ($R_4S_1$). Credit values for a second symbol type 549*e* ($R_4S_2$) for reel 534 (i.e., reel 4) are chosen randomly from lookup table 547 for reel 534 (i.e., reel 4) and the second symbol type 549*e* ($R_4S_2$). Credit values for a third symbol type 549*f* ($R_4S_3$) for reel 534 (i.e., reel 4) are chosen randomly from lookup table 547 for reel 534 (i.e., reel 4) and the third symbol type 549*f* ($R_4S_3$). The first symbol type 549*d* ($R_4S_1$) for reel 534 (i.e., reel 4) would have the lowest range of credit values. The third symbol type 549*f* ($R_4S_3$) for reel 534 (i.e., reel 4) would have the highest range of credit values. The second symbol type 549*e* ($R_4S_2$) for reel 534 (i.e., reel 4) would have credit values in a range between the lookup tables 549*d* and 549*f*, respectively, for the first symbol type 549*d* ($R_4S_1$) and third symbol type 549*f* ($R_4S_3$) for reel 534 (i.e., reel 4). In some implementations, when the special symbols (e.g., Buffalo symbols) on reel 534 are in a single high stack, the single high stack of special symbols is changed to the second symbol type 549*e* ($R_4S_2$) and/or the third symbol type 549*f* ($R_4S_3$). In some implementations, the third symbol types on reel 534 are given the same value from lookup table (the third symbol type 549*f* ($R_4S_3$)), and the second symbol types on reel 534 are given the same value from lookup table (the second symbol type 549*e* ($R_4S_2$)). The remaining special symbols on reel 534 are populated sequentially with values drawn from the lookup table (the first symbol type 549*d* ($R_4S_1$)).

For reel 536 (i.e., reel 5), credit values 538 for a first symbol type 549 ($R_5S_1$) for reel 536 (i.e., reel 5) are chosen randomly from a lookup table 547 for reel 536 (i.e., reel 5) and the first symbol type 549*g* ($R_5S_1$). Credit values for a second symbol type 549*h* ($R_5S_2$) for reel 536 (i.e., reel 5) are chosen randomly from lookup table 547 for reel 536 (i.e., reel 5) and the second symbol type 549*h* ($R_5S_2$). Credit values for a third symbol type 549*i* ($R_5S_3$) for reel 536 (i.e., reel 5) are chosen randomly from lookup table 547 for reel 536 (i.e., reel 5) and the third symbol type 549*i* ($R_5S_3$). The first symbol type 549*g* ($R_5S_1$) for reel 536 (i.e., reel 5) would have the lowest range of credit values. The third symbol type 549*i* ($R_5S_3$) for reel 536 (i.e., reel 5) would have the highest range of credit values. The second symbol type 549*h* ($R_5S_2$) for reel 536 (i.e., reel 5) would have credit values in a range between the lookup tables 549*g* and 549*i*, respectively, for the first symbol type 549*g* ($R_5S_1$) and third symbol type 549*i* ($R_5S_3$) for reel 536 (i.e., reel 5). On reel 536, in a single high stack of special symbols, the special symbols are changed to the third symbol type 549*i* ($R_5S_3$) and the third symbol types are given the same value from the third symbol type 549*i* ($R_5S_3$). The remaining special symbols on reel 536 are populated sequentially with the first symbol type and the second symbol type values drawn from the lookup tables (the first symbol type 549*g* ($R_5S_1$) and the second symbol type 549*h* ($R_5S_2$)), respectively.

In some implementations, all symbol types (e.g., $R_3S_1$, $R_3S_2$, $R_3S_3$, $R_4S_1$, $R_4S_2$, $R_4S_3$, $R_5S_1$, $R_5S_2$, $R_5S_3$) include the same symbol (e.g., the Buffalo symbol) with different assignable values. In other implementations, symbol types for one reel (e.g., $R_3$) are the same within the one reel, but are different from the symbol types on other reels (e.g., $R_4$, $R_5$). In still other implementations, symbol types on a respective reel (e.g., $R_3$) include the same symbol, but may be different from the symbol types on a different reel (e.g., $R_4$), which may, in turn, be different from the symbol types on yet another different reel (e.g., $R_5$).

It is understood that more or less than three symbol types 549 and three lookup tables 547 per reel may be implemented in other implementations. Also, credit value ranges different from a low to high range within a reel or among reels are possible.

At block 576, the game controller converts, changes, or assigns each of the plurality of special symbols (e.g., special symbol 418 as shown on FIG. 4) on each feature reel 532, 534 and 536 to the corresponding symbol type 549 selected from the corresponding lookup table 547, which forms, composes, or constitutes a converted symbol. The conversion, change, or assignment of each the plurality of special symbols 418 as shown on FIG. 4 may be by a random assignment, and may include the addition of a credit value or other benefit.

In this regard, as shown in FIG. 5B, block 572, along with blocks 574 and 576, are executed after block 554. Specifically, as shown in FIG. 5B, after the game controller 202 has selected a plurality of symbols from the symbol set for display in each of a plurality of symbol positions, e.g., symbol position 512, on the plurality of reels 528, 530, 532, 534, and 536 (e.g., reels 1-5) of FIG. 5C, the backend process 500 proceeds to block 572 to associate each respective feature reel, e.g., reels 532, 534 and 536, to at least one lookup table 547 as similarly described above with respect to FIG. 5A. At block 574 of FIG. 5B, the backend process 500 proceeds to also randomly select the symbol types 549 from the corresponding lookup table for each feature reel 532, 534 and 536 (e.g., reels 4, 5 and 6) as described with respect to FIG. 5A. At block 576 of FIG. 5B, the backend process 500 proceeds to convert, change, or assign each of the plurality of special symbols (e.g., special symbol 418 as shown on FIG. 4) on each feature reel 532, 534 and 536 to the corresponding symbol type 549 selected from the corresponding lookup table 547, which forms, composes, or constitutes a converted symbol as similarly described above with respect to FIG. 5A. As shown in FIG. 5B, the backend process 500 proceeds to return to block 556 to cause the main display 128 to display a spinning of the reels, and at least a portion of the symbol positions 412 of each of the reels or reel strips is displayed or visible to the player in reel window 150 of FIG. 1 and other similar processes in FIG. 5A.

As should be apparent from the above illustrated implementations, the techniques employed in these implementations address the technical problem of controlling volatility for a target volatility criterion or target RTP in an electronic gaming device in a feature mode that evaluates fewer than all of the visible portion of the reels for an outcome. The implementations illustrated reduce and/or avoid randomly generating multiple game outcomes before finding an outcome that satisfies one or more target thresholds. Instead of randomly generating game outcomes until the game satisfies the one or more target thresholds in a feature mode driven by fewer than all of the visible reels for an outcome, the implementations illustrated associate one or more reel strips to multiple lookup tables used to generate the credit values for credit symbols. By doing so, the feature mode can control game volatility and/or maximum win liability.

Referring to FIGS. 5A and 5C, at block 578, the game controller 202 stops first feature reel 532 (e.g., reel 3), and then determines, at block 580, if the displayed symbols of the stopped first reel 532 include the symbol types 549 (of FIG. 5A). If the game controller 202 (of FIG. 2A) determines at block 580 that the displayed symbols of the first stopped reel 532 (e.g., reel 3) do not include at least symbol types 549, the backend process 500 proceeds to block 566 to stop second reel 534 (e.g., reel 4) from spinning, which can be concurrent or followed by proceeding to block 568 to stop third reel 536 (e.g., reel 5) from spinning. Backend process 500 proceeds to block 598 to determine if a combination of symbols displayed in symbol positions, e.g., symbol position 512 on visible reels 528, 530, 532, 534, and 536 in FIG. 5C, result in a win outcome.

Returning to block 580, if the game controller 202 determines the displayed symbols of reel 532 (e.g., reel 3) include at least one symbol type 549, the game controller 202 stops reel 534 (e.g., reel 4). At block 584, if the game controller 202 determines that the displayed symbols of the second stopped reel 534 (e.g., reel 4) do not include at least one symbol type 549, the backend process 500 proceeds to block 586 to stop reel 536 (e.g., reel 5), and, at block 588, selects the credit values or benefits of the symbol types 549 displayed on reel 532 (e.g., reel 3), and, if so configured, any other appropriately determined win combination of symbols displayed in symbol positions, e.g., symbol positions 512 on visible reels 528, 530, 532, 534, and 536 in FIG. 5C. In some implementations, a win combination may be determined from all of a plurality of symbol type symbols selected for display in a single direction without being consecutive across the set of reel strips, or in a single direction, consecutively across the set of reel strips.

Returning to block 584, the game controller 202 determines if the displayed symbols of the stopped reel 534 (e.g., reel 4) include at least one symbol type 549. If the game controller 202 determines at block 584 that the displayed symbols of the second stopped reel 534 (e.g., reel 4) includes at least one symbol type 549, the backend process 500 proceeds to block 590 to stop third reel 536 (e.g., reel 5) from spinning, which can be stopped concurrently or subsequently to reel 534. At block 592, if the game controller 202 determines that the displayed symbols of the third stopped reel 536 (e.g., reel 5) do not include at least one symbol type 549, the backend process 500 proceeds to block 594 to select the credit values or benefits of the symbol types 549 displayed on both reel 532 (e.g., reel 3) and reel 534 (e.g., reel 4), and, if so configured, any other appropriately determined win combination of symbols displayed in symbol positions, e.g., symbol positions 512 on visible reels 528, 530, 532, 534, and 536 in FIG. 5C.

Returning to block 592, if the game controller 202 determines the displayed symbols of the reel 536 (e.g., reel 5) include at least one symbol type 549, the game controller 202 proceeds to block 596 to select the credit values or benefits of the symbol types 549 displayed on all reels 532 (e.g., reel 3), reel 534 (e.g., reel 4), reel 536 (e.g., reel 5), and, if so configured, any other appropriately determined win combination of symbols displayed in symbol positions, e.g., symbol positions 512 on visible reels 528, 530, 532, 534, and 536 in FIG. 5C.

In some implementations, a three of a kind Buffalo win awards the three of a kind win and additionally all of the visible credit values on reel 532 (e.g., reel 3). A four of a kind Buffalo win awards the four of a kind win and additionally all of the visible credit values on reel 532 (e.g., reel 3), and reel 534 (e.g., reel 4). And a five of a kind Buffalo win will award the five of a kind win and additionally all of the visible credit values on reel 532 (e.g., reel 3), 534 (e.g., reel 4), 536 (e.g., reel 5) and all of the visible Jackpots on reel 5. By way of further example, during certain feature modes, all wins may be multiplied by ×2, ×3, ×5, or ×10, which would include all of the visible credit values on reel 532 (e.g., reel 3), 534 (e.g., reel 4), 536 (e.g., reel 5) and all of the visible Jackpots on reel 5.

FIG. 6 shows first graphical user interface 600 in a portrait view on gaming device 104B (of FIG. 1). The first graphical user interface 600 includes a variety of features described above having similar reference numbers, and displays a portion representing a progressive award 602, jackpot meters (e.g., super 604, major 606, minor 608 and mini 610), a plurality of symbols (e.g., game symbols 614, free game symbols 616, and special symbols 618 with overlaid credit values 638) positioned in symbol positions 612 on reels 628, 630, 632, 634 and 636, which are shown in a three row configuration. In this implementation, the bottom portion of the graphical user interface 600 provide game status information, e.g., game rules 619, bet amount 620, win amount 622, accumulated credit 624 and denomination 626. Denominations 626 may be dependent on single site progressives and multi-site progressives. The graphical user interface 600 shows no win.

Figure 7:
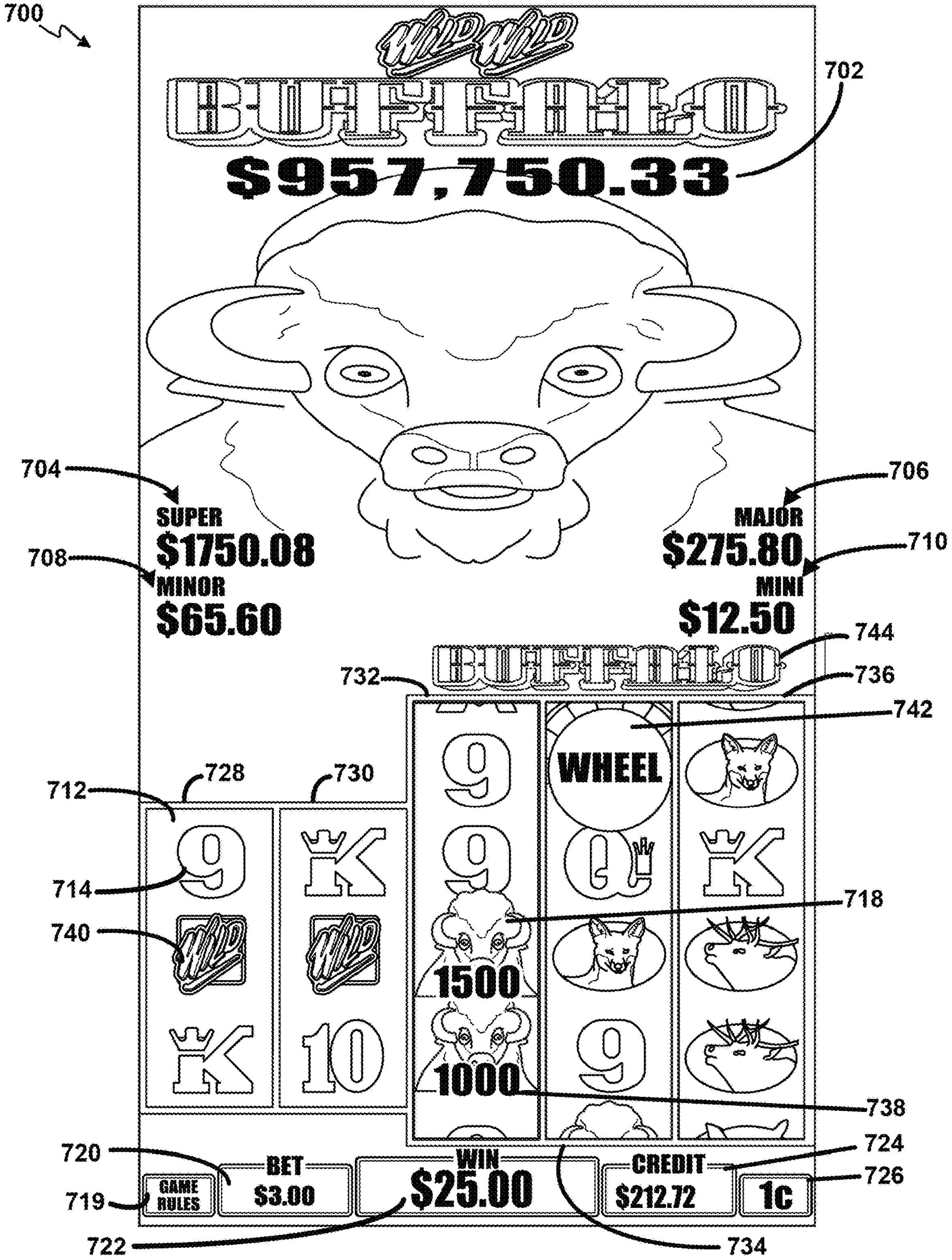
FIG. 7 illustrates an exemplary second graphical user interface on a gaming device according to illustrated implementations.

FIG. 7 shows a second graphical user interface 700 in a portrait view on gaming device 104B (of FIG. 1). The second graphical user interface 700 includes a variety of features described above having similar reference numbers, and displays a portion representing a progressive award 702, jackpot meters (e.g. super 704, major 706, minor 708 and mini 710), a plurality of symbols (e.g., game symbols 714, trigger symbols 740, and special symbols 718 with overlaid credit values 738 and bonus feature symbol 742 (e.g., “Wheel” symbol that may trigger a wheel bonus feature game) positioned in symbol positions 712 in reels 728, 730, 732, 734 and 736, where reels 732, 734 and 736 have been expanded to a four row reel configuration. In this implementation, the bottom portion of the graphical user interface 700 provide game status information, e.g., the game rules 719, bet amount 720, win amount 722, accumulated credit 724 and coin values 726. In the implementation of FIG. 7, reel 728 and reel 730 (e.g., reels 1 and 2) each display a trigger symbol 740. The display, on the graphical user interface 700, of the trigger symbols 740 triggers the expansion of the reels 732, 734 and 736 to four rows (e.g., from three rows in FIG. 6) and the initiation of the feature mode that launches a “Buffalo” graphic 744, along with other graphical and audio interactions to aid the player. In this implementation, only reel 732 (e.g., reel 3) displays a symbol type 549 and it is in a stack on reel 732 (i.e., a Buffalo symbol with 1500 credits stacked with a Buffalo symbol with 1000 credits); thus, the player wins $25.00 credits from the stacked symbol type 549 on reel 732.

Figure 8:
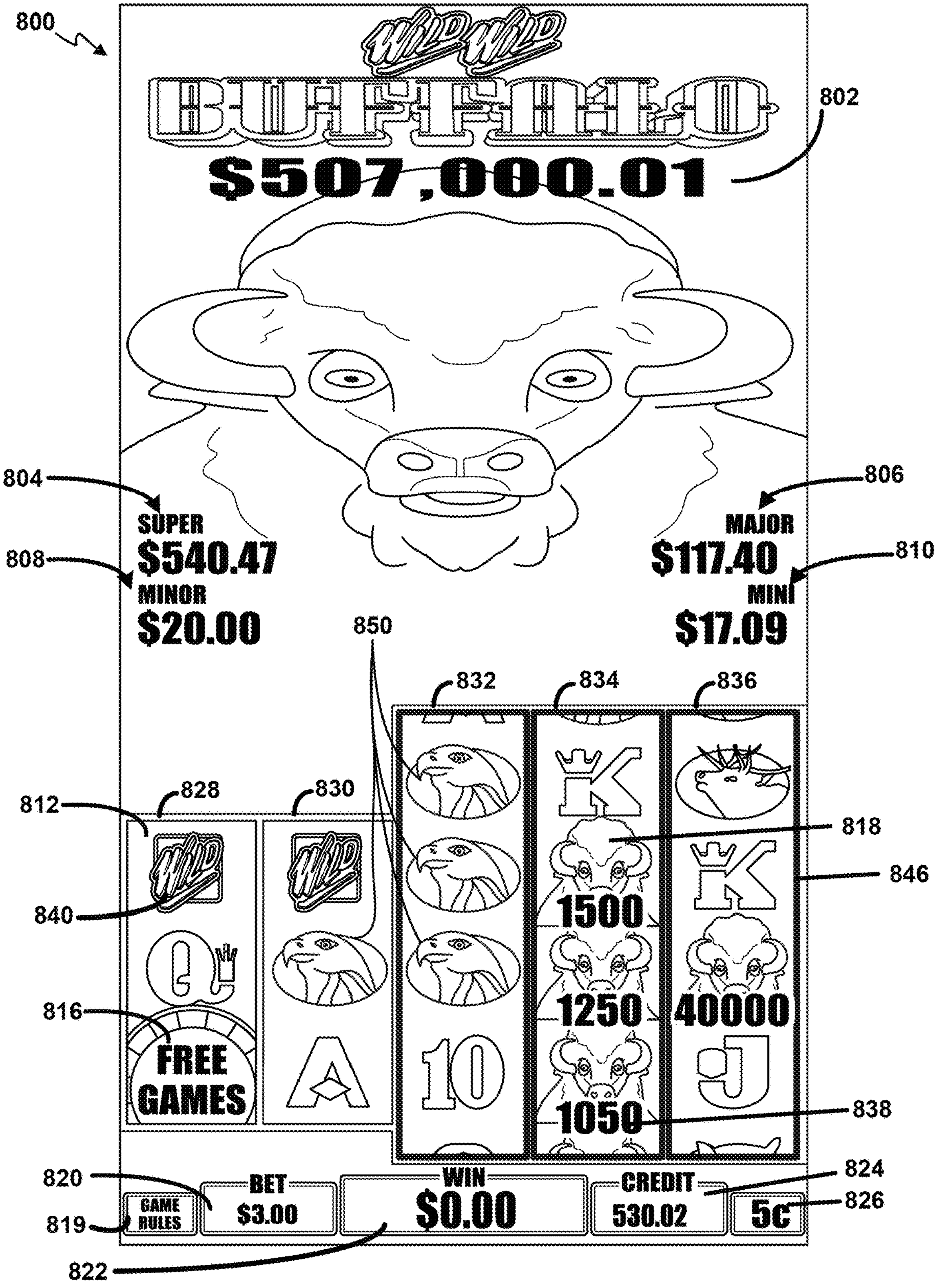
FIG. 8 illustrates an exemplary third graphical user interface on a gaming device according to illustrated implementations.

FIG. 8 shows a third graphical user interface 800 in a portrait view on gaming device 104B (of FIG. 1), and with a plurality of symbol types 549. The third graphical user interface 800 includes a variety of features described above having similar reference numbers. The third graphical interface 800 shows reels 828 and 830 (e.g., reels 1 and 2) each display a trigger symbol (e.g., WILD symbols). The third graphical interface 800 also shows a free game symbol 816 on reel 828 (e.g., reel 1), and that reels 832, 834 and 836 have grown to include four display positions per reel. The display, on the graphical user interface 800, of the trigger symbols 840 launches an enhanced reel graphic 846 around the reels 832, 834 and 836, and other graphical and audio interactions to aid the player. In this implementation, reel 832 (e.g., reel 3) does not show any symbol type 549, reel 834 (e.g., reel 4) shows a symbol type 549 in a stack of three special symbols 818 (overlaid with credit values 838 of 1500, 1250 and 1050, respectively) and reel 836 (e.g., reel 5) shows a symbol type 549 as a single special symbol 818 with an overlaid 40000 credit value; thus, the player does not win ($0.00) in this implementation, since symbol types 549 do not appear consecutively across the reels and specifically no special symbol type 549 is visible in reel 832 (e.g., reel 3) and there is no other pay line win combination. In some other implementations, a predetermined number of particular symbol types may be awarded even when there are no symbol types 549 being visible consecutively across the reels. For example, as shown in FIG. 8, a total of four eagle symbols 850 being displayed in the third graphical user interface 800 (one eagle symbol 850 and three eagle symbols 850 are shown in columns 830 and 832, respectively) may be awarded when there are no symbol types 549 being visible consecutively across the reels.

Figure 9:
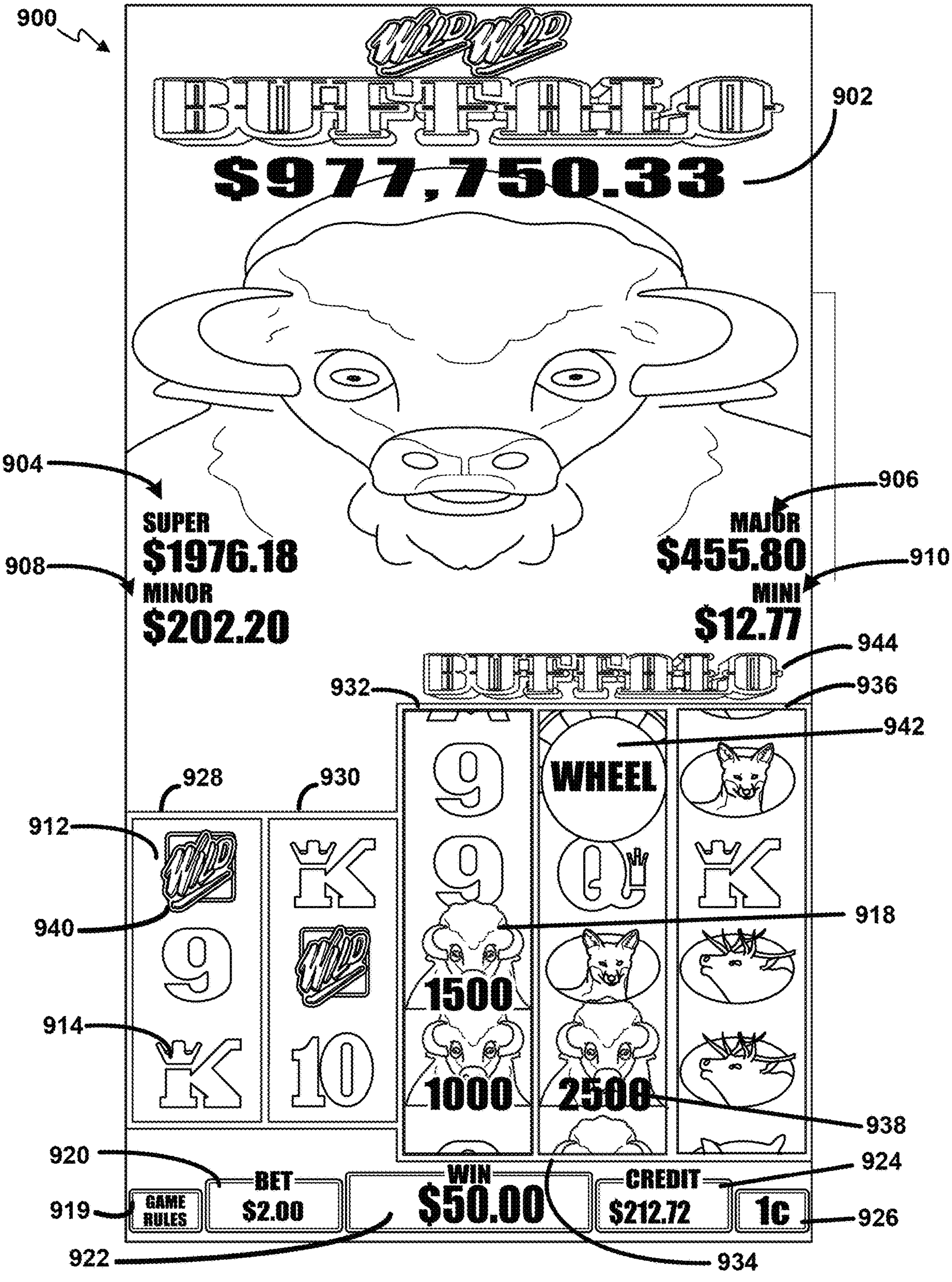
FIG. 9 illustrates an exemplary fourth graphical user interface on a gaming device according to illustrated implementations.

FIG. 9 shows a fourth graphical user interface 900 in a portrait view on gaming device 104B (of FIG. 1). The fourth graphical user interface 900 includes a variety of features described above having similar reference numbers, and displays a portion representing a progressive award 902, jackpot meters (e.g. super 904, major 906, minor 908 and mini 910), a plurality of symbols (e.g., game symbols 914, trigger symbols 940, special symbols 918 with overlaid credit values 938, and bonus feature symbol 944 (e.g., “Wheel” symbol)) positioned in symbol positions 912 in reels 928, 930, 932, 934 and 936. In the implementation of FIG. 9, reel 928 and reel 930 (e.g., reels 1 and 2) each display a trigger symbol 940. The display of the trigger symbols 940, on the graphical user interface 900, triggers the expansion of the reels 932, 934, and 936 to four rows and the initiation of the feature mode launches a “Buffalo” graphic 944 and other graphical and audio interactions to aid the player. In this implementation, reel 932 (e.g., reel 3) displays a symbol type 549 in a stack of three special symbols 818 (overlaid with credit values 838 of 1500 and 1000, respectively), reel 934 (e.g., reel 4) displays a symbol type 549 in the form of single special symbol (i.e., Buffalo symbol overlaid with 2500 credits), and reel 936 (e.g., reel 5) does not display any symbol type 549; thus, the player wins $50.00 from the symbol types 549 consecutively across respective reels 932 and 934.

Figure 10:
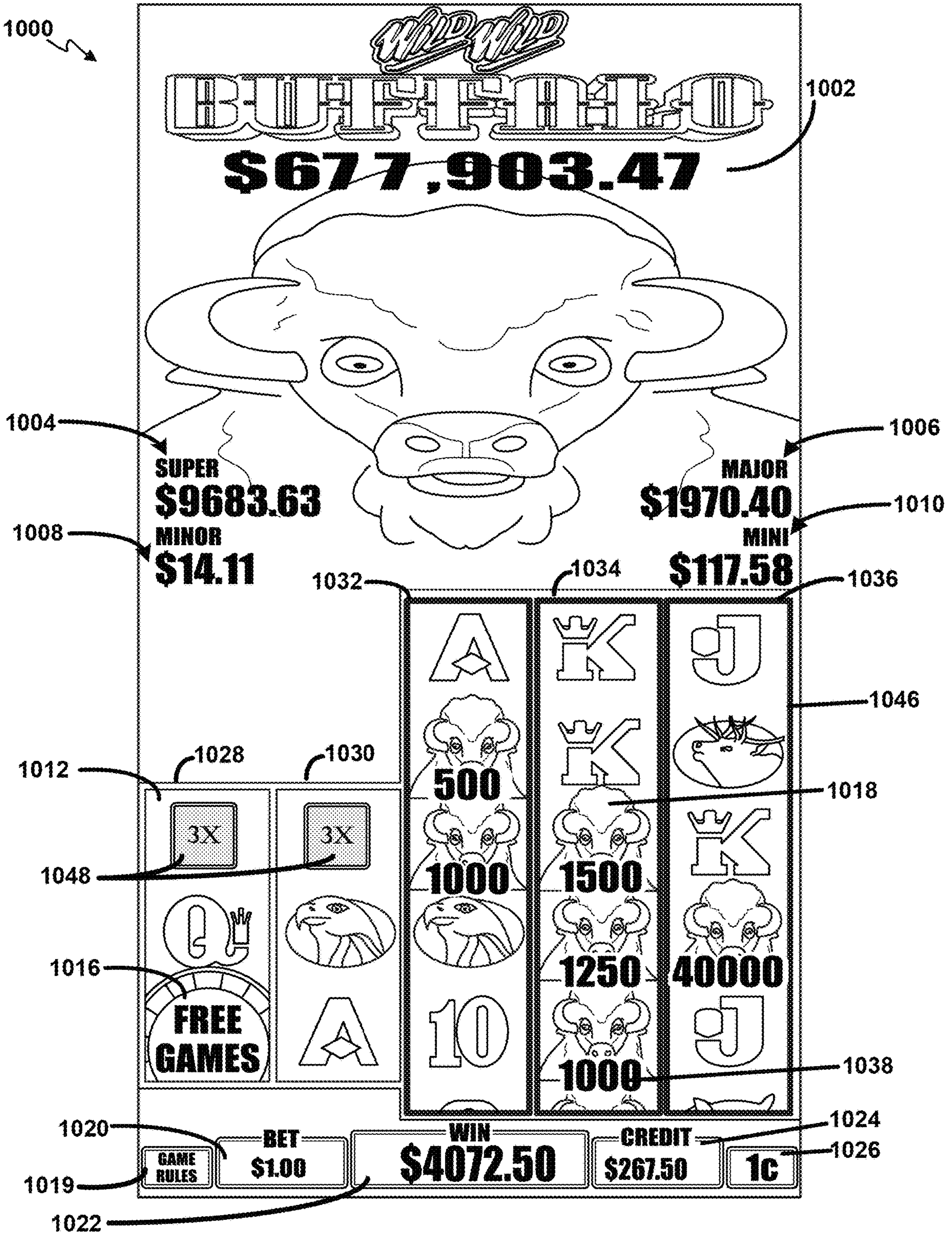
FIG. 10 illustrates an exemplary fifth graphical user interface on a gaming device according to illustrated implementations.

FIG. 10 shows a fifth graphical user interface 1000 in a portrait view on gaming device 104B (of FIG. 1), and with a plurality of symbol types 549. The fifth graphical user interface 1000 includes a variety of features described above having similar reference numbers. The fifth graphical interface 1000 shows reel 1028 and reel 1030 (e.g., reels 1 and 2), each displays a trigger symbol 1048 (e.g., 3× multiplier symbols). The fifth graphical interface 1000 also shows a free game symbol 1016 on reel 1028 (e.g., reel 1), and that reels 1032, 1034 and 1036 have grown to include four display positions per reel. The trigger symbols 1048 launch an enhanced reel graphic 1046 around the reels 1032, 1034 and 1036, and other graphical and audio interactions to aid the player. In this implementation, reel 1032 (e.g., reel 3) shows symbol type 549 in a stack of two special symbols 1018 (overlaid with credit values 1038 of 500 and 1000, respectively), reel 1034 (e.g., reel 4) shows a symbol type 549 in a stack of three special symbols 1018 (overlaid with credit values 1038 of 1500, 1250 and 1000, respectively), and reel 1036 (e.g., reel 5) shows a symbol type 549 as a single special symbol 1018 (overlaid with a credit value of 40000). Thus, the player wins $4072.50 since there are special symbol type 549 consecutively across reels 1032, 1034 and 1036 (e.g., reels 3-5) that are 9× multiplied since there are two 3× multiplier symbols (trigger symbols 1048).

The present disclosure is neither a literal description of all implementations nor is it a comprehensive listing of features described herein that must be present in all implementations. To be sure, numerous implementations are described in this disclosure, and are presented for illustrative purposes only. One of ordinary skill in the art will recognize that the implementations described herein may be practiced with various modifications and alterations, such as structural, logical, software, and electrical modifications. Although particular features of the implementations described herein may be described with reference to one or more particular implementations and/or drawings, it should be understood that such features are not limited to usage in the one or more particular implementations or drawings with reference to which they are described, unless expressly specified otherwise.

For the sake of presentation, the detailed description and claims may use terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

In the claims which follow and in the preceding description, except where the context requires otherwise due to express language or necessary implication, the word "comprise" or variations such as "comprises" or "comprising" is used in an inclusive sense—e.g., to specify the presence of the stated features but not to preclude the presence or addition of further features in various implementations contemplated herein.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g., an electrically erasable programmable read-only memory (EEPROM), (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

a display device operable to display at least a portion of a plurality of reels at a plurality of symbol positions; and a controller comprising a processor and memory storing a symbol set including a plurality of game symbols and special symbols, a plurality of lookup tables, each of the plurality of lookup tables including a range of credit values, and instructions, which, when executed, cause the processor to at least:

access the memory during game play for a first table and a second table of the plurality of lookup tables with a first special symbol and a second special symbol from a first reel of the plurality of reels, respectively, wherein the range of credit values for the first table differs from the range of credit values for the second table, control the display device to animate a first converted symbol formed from the first special symbol and a first credit value based on one or more random numbers generated by a random number generator, and the first table, control the display device to animate a second converted symbol formed from the second special symbol and a second credit value based on the random numbers generated, and the second table, and control the electronic gaming device to generate a payout based on an outcome formed from a subset of game symbols including the first converted symbol with the first credit value and the second converted symbol with the second credit value, and based on a stop position of the first reel that includes the first converted symbol and the second converted symbol.

2. The electronic gaming device of claim 1, wherein the range of credit values is associated with a target volatility.

3. The electronic gaming device of claim 1, wherein the range of credit values for the first table is greater than the range of credit values for the second table.

4. The electronic gaming device of claim 1, wherein the instructions which, when executed, further cause the processor to evaluate a non-feature reel to determine whether a trigger symbol is selected in at least one symbol position on the non-feature reel.

5. The electronic gaming device of claim 1, wherein the instructions which, when executed, further cause the processor to determine a win combination in a single direction consecutively across the plurality of reels and at least one non-feature reel.

6. The electronic gaming device of claim 1, wherein the plurality of lookup tables include at least one of credits, prizes, and jackpots.

7. The electronic gaming device of claim 1, wherein the instructions which, when executed, further cause the processor to determine the first credit value associated with the first converted symbol based on whether the range of credit values for the first table achieves a target volatility.

8. A method for controlling a gaming system that comprises a plurality of devices, and a server being coupled to the plurality of devices and including a processor and a memory storing a plurality of game symbols and special symbols on a set of reel strips, a plurality of lookup tables, each of the plurality of lookup tables including a plurality of entries having a range of values, wherein the range of values for a first table of the plurality of lookup tables differs from the range of values for a second table of the plurality of lookup tables, and instructions, which, when executed, cause the processor at least to initiate a game, the method comprising:

controlling the processor to access the memory during play of the game for the first table and the second table with a first special symbol and a second ame special symbol on a first reel strip of the set of reel strips, respectively;

controlling a first device to animate the first special symbol and the second special symbol being overlaid with a first entry from the first table and a second entry from the second table, respectively, based on one or more random numbers generated by a random number generator;

controlling the first device to animate a subset of the plurality of game symbols being selected for each reel strip of the set of reel strips based on the random numbers generated; and controlling the first device to animate a win when a win combination exists across the set of reel strips being displayed including the first special symbol overlaid with the first entry and the second special symbol overlaid with the second entry based on the subset of the plurality of game symbols selected.

9. The method of claim 8, wherein the plurality of entries comprise a plurality of credit values associated with a first target volatility.

10. The method of claim 8, further comprising selecting the first entry satisfying a first target volatility, when the first target volatility is greater than a second target volatility and the first entry is greater than the second entry.

11. The method of claim 8, wherein the set of reel strips includes a non-feature reel strip and a feature reel strip, further comprising evaluating the non-feature reel strip to determine whether a trigger symbol is selected in at least one symbol position on the non-feature reel strip.

12. The method of claim 8, further comprising determining the win combination from the subset of the plurality of game symbols selected in a single direction consecutively across at least a portion of the set of reel strips.

13. The method of claim 8, wherein the plurality of entries include at least one of credit values, prizes, and jackpot values.

14. The method of claim 8, further comprising determining the win combination from the subset of the plurality of game symbols by evaluating a single direction consecutively across the set of reel strips.

15. The method of claim 8, further comprising determining whether the first table satisfies a first target volatility.

16. A non-transitory computer-readable medium comprising a plurality of game symbols and special symbols, a plurality of lookup tables, a plurality of reels, and instructions for conducting a game on a plurality of devices comprising a display device operable to display a portion of the plurality of reels, and a controller comprising a processor, and the instructions, when executed, cause the processor to perform the steps of:

accessing the non-transitory computer-readable medium during game play for the plurality of lookup tables with the plurality of game symbols on a first reel of the plurality of reels, each of the plurality of lookup tables including a plurality of entries having a range of values, wherein the range of values for each of the plurality of lookup tables differs among each of the plurality of lookup tables;

controlling the display device to animate the special symbols on the first reel being converted into one or more converted symbols with a subset of entries in the plurality of entries of the plurality of lookup tables associated with the first reel of the plurality of reels based on one or more random numbers generated by a random number generator;

controlling the display device to display the portion of the plurality of reels responsive to the special symbols having been converted; and controlling the display device to generate a payout when the portion of the plurality of reels displayed includes a win combination.

17. The non-transitory computer-readable medium of claim 16, wherein the range of values is associated with a target volatility.

18. The non-transitory computer-readable medium of claim 16, wherein the instructions which, when executed, further cause the processor to perform the step of increasing a number of symbol positions in the portion of the plurality of reels, when a predetermined symbol is selected.

19. The non-transitory computer-readable medium of claim 16, wherein the instructions which, when executed, further cause the processor to perform the step of determining whether the subset of entries in a first table satisfies a first target volatility.

20. The non-transitory computer-readable medium of claim 16, wherein the instructions which, when executed, further cause the processor to perform the step of determining the win combination in a single direction consecutively across the portion of the plurality of reels.

* * * * *